United States Patent
Du et al.

(10) Patent No.: US 11,273,838 B2
(45) Date of Patent: Mar. 15, 2022

(54) METHOD AND APPARATUS FOR DETERMINING VEHICLE SPEED

(71) Applicant: Huawei Technologies Co., Ltd., Shenzhen (CN)

(72) Inventors: Mingbo Du, Shanghai (CN); Yongxiang Tao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/322,388

(22) Filed: May 17, 2021

(65) Prior Publication Data
US 2021/0276572 A1 Sep. 9, 2021

Related U.S. Application Data

(63) Continuation of application No. PCT/CN2020/102644, filed on Jul. 17, 2020.

(30) Foreign Application Priority Data

Jul. 17, 2019 (CN) .......................... 201910646083.4

(51) Int. Cl.
*B60W 40/105* (2012.01)
*B60W 30/14* (2006.01)
*B60W 40/04* (2006.01)

(52) U.S. Cl.
CPC ........ *B60W 40/105* (2013.01); *B60W 30/143* (2013.01); *B60W 40/04* (2013.01);
(Continued)

(58) Field of Classification Search
CPC .. B60W 30/143; B60W 40/04; B60W 40/105; B60W 2554/4041; B60W 2554/4045; B60W 2720/10
(Continued)

(56) References Cited

U.S. PATENT DOCUMENTS 8,762,043 B2 * 6/2014 Eidehall ............ B62D 15/0265
701/301
9,187,088 B1 * 11/2015 Ferguson ............ B60W 30/09
(Continued)

FOREIGN PATENT DOCUMENTS

CN  103640532 A  3/2014
CN  103996312 A  8/2014
(Continued)

OTHER PUBLICATIONS

Lu, J., et al., "Analysis of Rear-end Risk Based on the Indicator of Time to Collision," Journal of Transport Information and Safety, 2014, with an English abstract, 8 pages.
(Continued)

*Primary Examiner* — Atul Trivedi
(74) *Attorney, Agent, or Firm* — Conley Rose, P.C.

(57) ABSTRACT

A method and an apparatus for determining a vehicle speed computing a probability distribution of action intentions based on observation information of a surrounding object. Then, a probability redistribution of the different action intentions is computed based on travel times for the vehicle to travel from a current position to risk areas corresponding to the different action intentions, motion status variations of the surrounding object with the different action intentions are predicted based on the travel times for the vehicle to travel to the risk areas corresponding to the different action intentions. Finally, the travelling speed of the vehicle is determined based on the probability redistribution of the different action intentions, the motion status variations of the surrounding object with the different action intentions, and motion status variations of the vehicle under different travelling speed control actions.

20 Claims, 11 Drawing Sheets

Vehicle 200

(52) U.S. Cl.
CPC .............. *B60W 2554/4041* (2020.02); *B60W 2554/4045* (2020.02); *B60W 2720/10* (2013.01)

(58) Field of Classification Search
USPC .......................................................... 701/93
See application file for complete search history.

(56) References Cited

U.S. PATENT DOCUMENTS

| | | | |
|---|---|---|---|
| 9,336,436 B1 | 5/2016 | Dowdall | |
| 9,440,647 B1 | 9/2016 | Sucan et al. | |
| 2007/0027597 A1 | 2/2007 | Breuel et al. | |
| 2015/0046078 A1 | 2/2015 | Biess et al. | |
| 2015/0298693 A1 | 10/2015 | Uechi | |
| 2016/0152208 A1 | 6/2016 | Ewert et al. | |
| 2016/0185347 A1* | 6/2016 | Lefevre | B60W 30/18154 701/301 |
| 2016/0327953 A1 | 11/2016 | Nilsson et al. | |
| 2017/0016734 A1* | 1/2017 | Gupta | G01C 21/3697 |
| 2017/0031361 A1* | 2/2017 | Olson | B60W 30/0953 |
| 2017/0057497 A1 | 3/2017 | Laur et al. | |
| 2018/0093664 A1* | 4/2018 | Kim | B60W 10/20 |
| 2018/0093666 A1* | 4/2018 | Kim | B60W 30/16 |
| 2018/0093668 A1* | 4/2018 | Kim | B60W 50/14 |
| 2018/0141544 A1* | 5/2018 | Xiao | G08G 1/164 |
| 2018/0281785 A1* | 10/2018 | Berntorp | G08G 1/167 |
| 2018/0284785 A1* | 10/2018 | Berntorp | G08G 1/0112 |
| 2019/0100200 A1* | 4/2019 | McNew | B60W 30/18145 |
| 2019/0103023 A1* | 4/2019 | McNew | G08G 1/0962 |
| 2019/0152490 A1* | 5/2019 | Lan | B60W 30/0956 |
| 2019/0367021 A1* | 12/2019 | Zhao | B60W 60/00274 |
| 2019/0389459 A1* | 12/2019 | Berntorp | G08G 1/167 |
| 2020/0023838 A1* | 1/2020 | Zhang | G08G 1/0104 |
| 2020/0086855 A1* | 3/2020 | Packer | B60W 30/09 |
| 2020/0211395 A1 | 7/2020 | Feist et al. | |
| 2020/0393261 A1* | 12/2020 | Zhang | G01C 21/3492 |
| 2021/0035442 A1* | 2/2021 | Baig | G05D 1/0038 |

FOREIGN PATENT DOCUMENTS

| | | | | |
|---|---|---|---|---|
| CN | 104340152 A | | 2/2015 | |
| CN | 104756175 A | | 7/2015 | |
| CN | 105358383 A | | 2/2016 | |
| CN | 106114503 A | | 11/2016 | |
| CN | 106227204 A | | 12/2016 | |
| CN | 106428000 A | | 2/2017 | |
| CN | 106515725 A | | 3/2017 | |
| CN | 108230676 A | | 6/2018 | |
| CN | 108458745 A | | 8/2018 | |
| CN | 109969172 A | | 7/2019 | |
| CN | 112242069 A | * | 1/2021 | ............ B60W 30/08 |
| DE | 102018132813 A1 | | 4/2019 | |
| EP | 3342669 A1 | * | 7/2018 | ............ G01S 7/412 |
| JP | 2007534041 A | | 11/2007 | |
| WO | WO-2017094656 A1 | * | 6/2017 | ........... G08G 1/0141 |
| WO | WO-2018115963 A2 | * | 6/2018 | ...... B60W 30/18163 |
| WO | 2019063416 A1 | | 4/2019 | |
| WO | 2019083978 A1 | | 5/2019 | |
| WO | WO-2019231521 A1 | * | 12/2019 | ........... G08G 1/0145 |
| WO | WO-2020099555 A1 | * | 5/2020 | ...... B60W 30/18154 |
| WO | WO-2021008605 A1 | * | 1/2021 | ............ B60W 30/08 |
| WO | WO-2021077725 A1 | * | 4/2021 | |
| WO | WO-2021133789 A1 | * | 7/2021 | ............. B60Q 9/008 |

OTHER PUBLICATIONS

Yuanfu Luo et al., "Porca: Modeling and Planning for Autonomous Driving among Many Pedestrians," arXiv:1805.11833v2 [cs.RO], Jul. 1, 2018, 8 pages.

"2020 Roadmap, European New Car Assessment Programme," Mar. 2015, 19 pages.

* cited by examiner

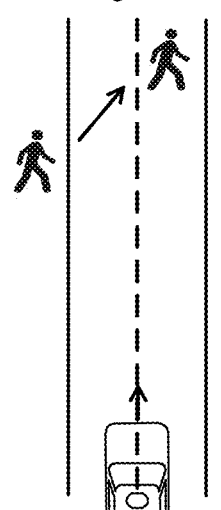
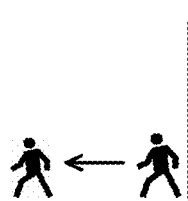
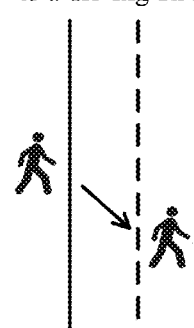
FIG. 6A g1: stepping forward along a sidewalk
FIG. 6B g2: stepping backward along a sidewalk
FIG. 6C g3: straight crossing a lane
FIG. 6D g4: diagonally crossing a lane in a driving direction
FIG. 6E g5: stepping away from a lane
FIG. 6F g6: diagonally crossing a lane in a direction opposite to a driving direction
FIG. 6G g7: stop

METHOD AND APPARATUS FOR DETERMINING VEHICLE SPEED

CROSS-REFERENCE TO RELATED APPLICATIONS

This application is a continuation of International Patent Application No. PCT/CN2020/102644 filed on Jul. 17, 2020, which claims priority to Chinese Patent Application No. 201910646083.4 filed on Jul. 17, 2019. The disclosures of the aforementioned applications are hereby incorporated by reference in their entireties.

TECHNICAL FIELD

This application relates to the field of vehicle technologies, and in particular, to a method and an apparatus for determining a vehicle speed.

BACKGROUND

In a self-driving technology or the like, to avoid a collision between a vehicle and an object such as a surrounding pedestrian, a vehicle speed needs to be determined based on a motion status of the surrounding object. As the motion status of the surrounding object is affected by a subjective action intention of the surrounding object, the vehicle may predict a possible action intention of the surrounding object, to determine a vehicle speed based on a motion status of the surrounding object corresponding to a possible action intention that can be learned through prediction. However, during prediction of the action intention of the surrounding object, impact caused by a risk of a collision between the surrounding object and the vehicle is usually ignored. Consequently, a determined vehicle speed is not appropriate enough, and there may be a safety risk when the vehicle travels.

SUMMARY

Embodiments of this application provide a method and an apparatus for determining a vehicle speed, so that a vehicle can determine a travelling speed of the vehicle based on a probability redistribution of action intentions of a surrounding object, motion status variations of the surrounding object with different action intentions, and motion status variations of the vehicle under different travelling speed control actions. In this way, a high risk, between the surrounding object and the vehicle, that is less likely to occur is not ignored. Therefore, a determined travelling speed is more appropriate, and a potential safety risk during travelling of the vehicle is reduced.

According to a first aspect, an embodiment of this application provides a method for determining a vehicle speed. The method may include obtaining observation information of a surrounding object of a vehicle by observing the surrounding object of the vehicle, computing, based on the observation information of the surrounding object, a probability distribution of different action intentions of the surrounding object, performing redistribution computation on the probability distribution based on travel times for the vehicle to travel from a current position of the vehicle to risk areas corresponding to the different action intentions, to obtain a probability redistribution of the different action intentions, where the risk areas corresponding to the different action intentions are areas in which the surrounding object with the different action intentions passes in a lane in which the vehicle travels, predicting motion status variations of the surrounding object with the different action intentions based on the travel times for the vehicle to travel to the risk areas corresponding to the different action intentions, and determining a travelling speed of the vehicle based on the probability redistribution of the different action intentions, the motion status variations of the surrounding object with the different action intentions, and motion status variations of the vehicle under different travelling speed control actions.

It can be learned that, according to the method provided in this embodiment of this application, in a travelling process of the vehicle, for the plurality of possible action intentions of the surrounding object of the vehicle, the probability distribution of the action intentions may be computed based on the observation information of the surrounding object. Then, the probability redistribution of the different action intentions is computed based on the travel times for the vehicle to travel from the current position to the risk areas corresponding to the different action intentions. Further, the motion status variations of the surrounding object with the different action intentions are predicted based on the travel times for the vehicle to travel to the risk areas corresponding to the different action intentions. Finally, the travelling speed of the vehicle is determined based on the probability redistribution of the different action intentions, the motion status variations of the surrounding object with the different action intentions, and the motion status variations of the vehicle under different travelling speed control actions. In this way, during determining of the travelling speed of the vehicle, each possible action intention of the surrounding object is considered, and a risk degree of a collision, between the surrounding object and the vehicle, that is corresponding to each action intention and that is under control of each acceleration of the vehicle is further considered. In this way, a high risk, between the surrounding object and the vehicle, that is less likely to occur is not ignored. Therefore, a determined travelling speed is more appropriate for a current driving environment, and a potential safety risk during travelling of the vehicle is reduced.

With reference to a possible implementation of the first aspect, the computing, based on the observation information of the surrounding object, a probability distribution of different action intentions of the surrounding object may include the following operations during specific implementation: establishing, in a coordinate system that is based on the lane in which the vehicle travels, a relative position relationship between the surrounding object and the lane and a relative motion relationship between the surrounding object and the lane based on the observation information of the surrounding object, and computing the probability distribution of the different action intentions of the surrounding object based on the relative position relationship between the surrounding object and the lane and the relative motion relationship between the surrounding object and the lane. In this way, the probability distribution of the different action intentions of the surrounding object can be computed more conveniently and accurately through conversion of coordinate systems. This provides accurate data for subsequent determining of an appropriate vehicle speed.

With reference to another possible implementation of the first aspect, the method may further include obtaining observation information of the vehicle, establishing, in a coordinate system that is based on the lane in which the vehicle travels, a relative position relationship between the vehicle and the lane and a relative motion status between the vehicle and the lane, and a relative position relationship between the surrounding object and the lane and a relative motion status between the surrounding object and the lane based on the observation information of the vehicle and the observation information of the surrounding object; determining, based on the relative position relationship between the surrounding object and the lane and the relative motion status between the surrounding object and the lane, the risk areas corresponding to the different action intentions, and computing, based on the relative position relationship between the vehicle and the lane and the relative motion status between the vehicle and the lane, and the risk areas corresponding to the different action intentions, the travel times for the vehicle to travel from the current position of the vehicle to the risk areas corresponding to the different action intentions. In this way, during determining of the travelling speed of the vehicle, each possible action intention of the surrounding object is considered, and a risk degree of a collision, between the surrounding object and the vehicle, that is corresponding to each action intention and that is under control of each acceleration of the vehicle is further considered. In this way, a high risk, between the surrounding object and the vehicle, that is less likely to occur is not ignored. Therefore, a determined travelling speed is more appropriate for a current driving environment, and a potential safety risk during travelling of the vehicle is reduced.

With reference to still another possible implementation of the first aspect, performing redistribution computation on the probability distribution based on travel times for the vehicle to travel to risk areas corresponding to the different action intentions, to obtain a probability redistribution of the different action intentions may include the following operations during specific implementation: performing particle processing on the probability distribution, where quantities of particles corresponding to the different action intentions are used to represent the probability distribution of the different action intentions, and adjusting, based on the travel times that are obtained through computation and that are required for the vehicle to travel to the risk areas corresponding to the different action intentions, weights of the particles corresponding to the different action intentions, to obtain the probability redistribution of the different action intentions. In this case, to cover more surrounding objects and computes occurrence probabilities of all possible action intentions of each surrounding object, a concept of a particle may be introduced. Through particle processing and computation, a risk degree of each action intention can be determined based on a travel time required for the vehicle to travel to a risk area corresponding to the action intention. In other words, a probability redistribution of the different action intentions is obtained. This provides an indispensable data foundation for subsequent accurate determining of a speed of the vehicle and improvement of safety and reliability of a vehicle that uses an intelligent driving technology such as self-driving.

With reference to still yet another possible implementation of the first aspect, predicting motion status variations of the surrounding object with the different action intentions based on the travel times for the vehicle to travel to the risk areas corresponding to the different action intentions may include the following operations during specific implementation: determining, based on the travel times for the vehicle to travel to the risk areas corresponding to the different action intentions, probabilities that the surrounding object with the different action intentions changes the action intention, and predicting the motion status variations of the surrounding object with the different action intentions based on the probabilities that the surrounding object with the different action intentions changes the action intention and a random probability.

With reference to a further possible implementation of the first aspect, determining a travelling speed of the vehicle based on the probability redistribution of the different action intentions, the motion status variations of the surrounding object with the different action intentions, and motion status variations of the vehicle under different travelling speed control actions may include the following operations during specific implementation: estimating travelling effects of the vehicle that bring about under the different travelling speed control actions based on the probability redistribution of the different action intentions, the motion status variations of the surrounding object with the different action intentions, and the motion status variations of the vehicle under the different travelling speed control actions, selecting a target travelling speed control action from the different travelling speed control actions based on the travelling effects of the vehicle that bring about under the different travelling speed control actions, and determining the travelling speed of the vehicle based on the target travelling speed control action. In this way, during determining of the vehicle speed, each possible action intention of the surrounding object is considered, and a risk degree of a collision, between the surrounding object and the vehicle, that is corresponding to each action intention and that is under control of each acceleration of the vehicle is further considered. In this way, a high risk, between the surrounding object and the vehicle, that is less likely to occur is not ignored. Therefore, a determined travelling speed is more appropriate for a current driving environment, and a potential safety risk during travelling of the vehicle is reduced.

According to a second aspect, an embodiment of this application further provides an apparatus for determining a vehicle speed. The apparatus includes a first obtaining unit, a first computation unit, a second computation unit, a prediction unit, and a first determining unit. The first obtaining unit is configured to obtain observation information of a surrounding object of a vehicle. The first computation unit is configured to compute, based on the observation information of the surrounding object, a probability distribution of different action intentions of the surrounding object. The second computation unit is configured to perform redistribution computation on the probability distribution based on travel times for the vehicle to travel from a current position of the vehicle to risk areas corresponding to the different action intentions, to obtain a probability redistribution of the different action intentions. The risk areas corresponding to the different action intentions are areas in which the surrounding object with the different action intentions passes in a lane in which the vehicle travels. The prediction unit is configured to predict motion status variations of the surrounding object with the different action intentions based on the travel times for the vehicle to travel to the risk areas corresponding to the different action intentions. The first determining unit is configured to determine a travelling speed of the vehicle based on the probability redistribution of the different action intentions, the motion status variations of the surrounding object with the different action intentions, and motion status variations of the vehicle under different travelling speed control actions.

With reference to a possible implementation of the second aspect, the first computation unit may include an establishment subunit and a computation subunit. The establishment subunit is configured to establish, in a coordinate system that is based on the lane in which the vehicle travels, a relative position relationship between the surrounding object and the lane and a relative motion relationship between the surrounding object and the lane based on the observation information of the surrounding object. The computation subunit is configured to compute the probability distribution of the different action intentions of the surrounding object based on the relative position relationship between the surrounding object and the lane and the relative motion relationship between the surrounding object and the lane.

With reference to another possible implementation of the second aspect, the apparatus may further include a second obtaining unit, an establishment unit, a second determining unit, and a third computation unit. The second obtaining unit is configured to obtain observation information of the vehicle. The establishment unit is configured to establish, in a coordinate system that is based on the lane in which the vehicle travels, a relative position relationship between the vehicle and the lane and a relative motion status between the vehicle and the lane, and a relative position relationship between the surrounding object and the lane and a relative motion status between the surrounding object and the lane based on the observation information of the vehicle and the observation information of the surrounding object. The second determining unit is configured to determine, based on the relative position relationship between the surrounding object and the lane and the relative motion status between the surrounding object and the lane, the risk areas corresponding to the different action intentions. The third computation unit is configured to compute, based on the relative position relationship between the vehicle and the lane and the relative motion status between the vehicle and the lane, and the risk areas corresponding to the different action intentions, the travel times for the vehicle to travel from the current position of the vehicle to the risk areas corresponding to the different action intentions.

With reference to still another possible implementation of the second aspect, the second computation unit may include a processing subunit and an adjustment subunit. The processing subunit is configured to perform particle processing on the probability distribution, where quantities of particles corresponding to the different action intentions are used to represent the probability distribution of the different action intentions. The adjustment subunit is configured to adjust, based on the travel times that are obtained through computation and that are required for the vehicle to travel to the risk areas corresponding to the different action intentions, weights of the particles corresponding to the different action intentions, to obtain the probability redistribution of the different action intentions.

With reference to still yet another possible implementation of the second aspect, the prediction unit may include a first determining subunit and a prediction subunit. The first determining subunit is configured to determine, based on the travel times for the vehicle to travel to the risk areas corresponding to the different action intentions, probabilities that the surrounding object with the different action intentions changes the action intention. The prediction subunit is configured to predict the motion status variations of the surrounding object with the different action intentions based on the probabilities that the surrounding object with the different action intentions changes the action intention and a random probability.

With reference to a further possible implementation of the second aspect, the first determining unit may include an estimation subunit, a selection subunit, and a second determining subunit. The estimation subunit is configured to estimate travelling effects of the vehicle that bring about under the different travelling speed control actions based on the probability redistribution of the different action intentions, the motion status variations of the surrounding object with the different action intentions, and the motion status variations of the vehicle under the different travelling speed control actions. The selection subunit is configured to select a target travelling speed control action from the different travelling speed control actions based on the travelling effects of the vehicle that bring about under the different travelling speed control actions. The second determining subunit is configured to determine the travelling speed of the vehicle based on the target travelling speed control action.

It may be understood that the apparatus provided in the second aspect corresponds to the method provided in the first aspect. Therefore, for implementations of the second aspect and technical effects that can be achieved by the implementations of the second aspect, refer to related descriptions of the implementations of the first aspect.

According to a third aspect, an embodiment of this application further provides a vehicle. The vehicle includes a sensor, a processor, and a vehicle speed controller. The sensor is configured to obtain observation information of a surrounding object of the vehicle, and send the observation information to the processor. The processor is configured to determine a travelling speed of the vehicle according to the method in any implementation of the first aspect, and send the travelling speed to the vehicle speed controller. The speed controller is configured to control the vehicle to travel at the determined travelling speed of the vehicle.

According to a fourth aspect, an embodiment of this application further provides a vehicle. The vehicle includes a processor and a memory. The memory stores an instruction, and when the processor executes the instruction, the vehicle performs the method according to any one of the implementations of the first aspect.

According to a fifth aspect, an embodiment of this application further provides a computer program product. When the computer program product runs on a computer, the computer is enabled to perform the method according to any one of the implementations of the first aspect.

According to a sixth aspect, an embodiment of this application further provides a computer-readable storage medium. The computer-readable storage medium stores an instruction. When the instruction is run on a computer or a processor, the computer or the processor is enabled to perform the method according to any one of the implementations of the first aspect.

BRIEF DESCRIPTION OF DRAWINGS

To describe technical solutions in some embodiments of this application more clearly, the following briefly describes the accompanying drawings for describing the embodiments. Certainly, the accompanying drawings in the following descriptions show merely some embodiments described in this application, and a person of ordinary skill in the art may derive other drawings from these accompanying drawings.

FIG. 6A, FIG. 6B, FIG. 6C, FIG. 6D, FIG. 6E, FIG. 6F, and FIG. 6G are schematic diagrams of intentions of a pedestrian according to an embodiment of this application.

DESCRIPTION OF EMBODIMENTS

When a vehicle travels in a lane, a surrounding object such as a surrounding pedestrian or an animal needs to be considered in determining a vehicle speed, to avoid a traffic accident such as a collision with the surrounding object of the vehicle, and ensure safety of the vehicle and the surrounding object of the vehicle.

To better avoid the surrounding object such as a pedestrian, during determining of a travelling speed of a vehicle, considering that a motion status of the surrounding object is mainly affected by a subjective action intention of the surrounding object, the vehicle may predict a target action intention of the surrounding object by using behavior characteristics of the surrounding object. For example, the vehicle determines occurrence probabilities of various action intentions of the surrounding object based on the behavior characteristics of the surrounding object, and sets a probability threshold, to select an action intention with a relatively high occurrence probability as the target action intention. Then, the vehicle determines the vehicle speed based on a motion status of the surrounding object with the target action intention. However, in addition to the target action intention, the surrounding object may also have another action intention, and there may be a relatively large risk of a collision between the surrounding object and the vehicle with the other action intention. Therefore, if only the target action intention with a high occurrence probability is considered and the vehicle speed is determined based on the single target action intention that is obtained through prediction, some other action intentions that have a low occurrence probability but are highly likely to cause collision risks are ignored. In this case, once the surrounding object actually moves with the ignored action intention with a high collision risk, and the vehicle travels at the travelling speed determined based on the target action intention, it is very likely that the vehicle collides with the surrounding object. Consequently, a safety risk is caused.

Figure 1:
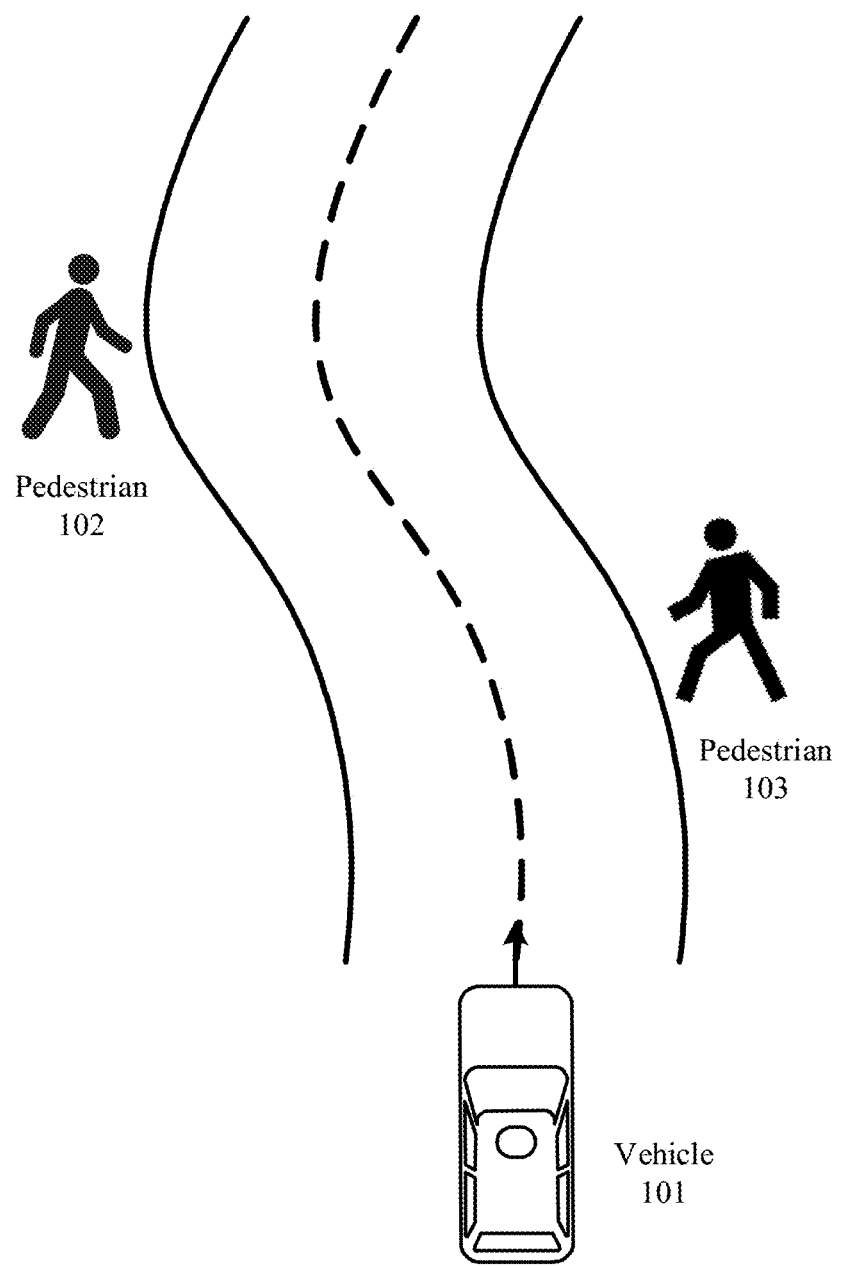
FIG. 1 is a schematic diagram of a road traffic scenario related to an application scenario according to an embodiment of this application.

For example, referring to a schematic diagram of a road traffic scenario shown in FIG. 1, a vehicle 101 drives by using a self-driving technology, and surrounding objects of the vehicle 101 in the scenario include a pedestrian 102 and a pedestrian 103. It is assumed that the vehicle 101 predicts respective target action intentions of the pedestrian 102 and the pedestrian 103 by using behavior characteristics of the pedestrian 102 and behavior characteristics of the pedestrian 103. The prediction is as follows. The target action intention of the pedestrian 102 is fast crossing a lane or diagonally crossing a lane in a driving direction, and the target action intention of the pedestrian 103 is stop. In this case, a determined vehicle speed of the vehicle 101 is 60 kilometers per hour (km/h). However, other possible action intentions of the pedestrian 102 and the pedestrian 103 that may cause collision with the vehicle 101 are not considered when the vehicle 101 predicts the action intentions. Therefore, the target action intention, obtained through prediction, of the pedestrian 103 that is closer to the vehicle 101 does not include an action intention of fast crossing the lane or an action intention of diagonally crossing the lane in the driving direction that is hardly likely to occur. In this case, the determined vehicle speed is relatively large. However, the pedestrian 103 may fast cross the lane or diagonally cross the lane in the driving direction. Because the target action intention of the pedestrian 103 is predicted inaccurately, the vehicle 101 is highly likely to ignore an action intention with a relatively high collision risk. In this case, when the vehicle 101 travels at the relatively high speed of 60 km/h, the vehicle 101 is highly likely to hit the pedestrian 103, causing a traffic accident related to the vehicle 101 and the pedestrian 103.

Based on this, to resolve a problem that a determined vehicle speed is inappropriate because an action intention of a surrounding object is not accurately or comprehensively predicted, in the embodiments of this application, a method for determining an appropriate vehicle speed is provided. The vehicle and a surrounding object of the vehicle can be safe provided that the vehicle travels at a determined appropriate speed. A specific process of determining the vehicle speed may include computing, based on observation information of the surrounding object, a probability distribution of all action intentions, and computing a probability redistribution of the different action intentions based on travel times for the vehicle to travel from a current position to risk areas corresponding to the different action intentions, predicting, based on the travel times for the vehicle to travel to the risk areas corresponding to the different action intentions, motion status variations of the surrounding object with the different action intentions, and determining a travelling speed of the vehicle based on the probability redistribution of the different action intentions, the motion status variations of the surrounding object with the different action intentions, and motion status variations of the vehicle under different accelerations. In this way, during determining of the vehicle speed, each possible action intention of the surrounding object is considered, and a risk degree of a collision, that is corresponding to each action intention, between the surrounding object and the vehicle that travels by using different accelerations are further considered. In this way, a high risk, between the surrounding object and the vehicle, that is less likely to occur is not ignored. Therefore, a determined travelling speed is more appropriate for a current driving environment, and a potential safety risk during travelling of the vehicle is reduced.

The scenario shown in FIG. 1 is still used as an example. Assuming that the vehicle 101 determines the vehicle speed by using the method provided in the embodiments of this application, a specific determining process may include the following. First, probability distributions $b_{102}$ and $b_{103}$ of seven action intentions (including: stepping forward along a sidewalk, stepping backward along a sidewalk, straight crossing a lane, diagonally crossing a lane in a driving direction, diagonally crossing a lane in a direction opposite to a driving direction, stepping away from a lane, and stop) of the pedestrian 102 and the pedestrian 103 are predicted respectively based on observation information of the pedestrian 102 and observation information of the pedestrian 103. $b_{102}$ includes a probability $P102i$ (i=1, 2, ..., 7) that the pedestrian 102 has each action intention, and $b_{103}$ includes a probability $P103i$ (i=1, 2, ..., 7) that the pedestrian 103 has each action intention. Then, for each action intention, an area in which the pedestrian 102 with the action intention passes in the lane in which the vehicle 101 travels is determined and recorded as a risk area corresponding to the pedestrian 102 with the action intention, and an area in which the pedestrian 103 with the action intention passes in the lane in which the vehicle 101 travels is determined and recorded as a risk area corresponding to the pedestrian 103 with the action intention. Then a travel time $T_{102i}$ required for the vehicle 101 to travel from a current position to the risk area corresponding to the pedestrian 102 is computed, and a travel time $T_{103i}$ required for the vehicle 101 to travel from the current position to the risk area corresponding to the pedestrian 103 is computed. After that, redistribution computation may be performed on the probability distribution $b_{102}$ based on the travel time $T_{102i}$, to obtain a probability redistribution $b'_{102}$ corresponding to the action intentions, and redistribution computation is performed on the probability distribution $b_{103}$ based on the travel time $T_{103i}$, to obtain a probability redistribution $b'_{103}$ corresponding to the action intentions. In addition, motion status variations of the pedestrian 102 with the different action intentions and motion status variations of the pedestrian 103 with the different action intentions may be further predicted respectively based on the travel time $T_{102i}$ and the travel time $T_{103i}$. Finally, the vehicle 101 may determine a travelling speed of the vehicle as 30 km/h based on the probability redistribution $b'_{102}$ and the probability redistribution $b'_{103}$, the motion status variations of the pedestrian 102 with the different action intentions and the motion status variations of the pedestrian 103 with the different action intentions, and motion status variations of the vehicle under different accelerations. In this way, during prediction of the action intentions of the pedestrian 102 and the pedestrian 103, various possible action intentions are considered, and a relatively appropriate vehicle speed is jointly determined with reference to situations that may occur when the vehicle uses different coping strategies under each action intention. Therefore, the vehicle 101 travels in the lane at a speed of 30 km/h, which is relatively safe. This effectively avoids a safety risk that may exist during travelling of the vehicle 101, and improves reliability and safety of a self-driving technology or the like.

Before the method for determining a vehicle speed provided in the embodiments of this application is described, a hardware architecture of a vehicle in the embodiments of this application is first described.

Figure 2:
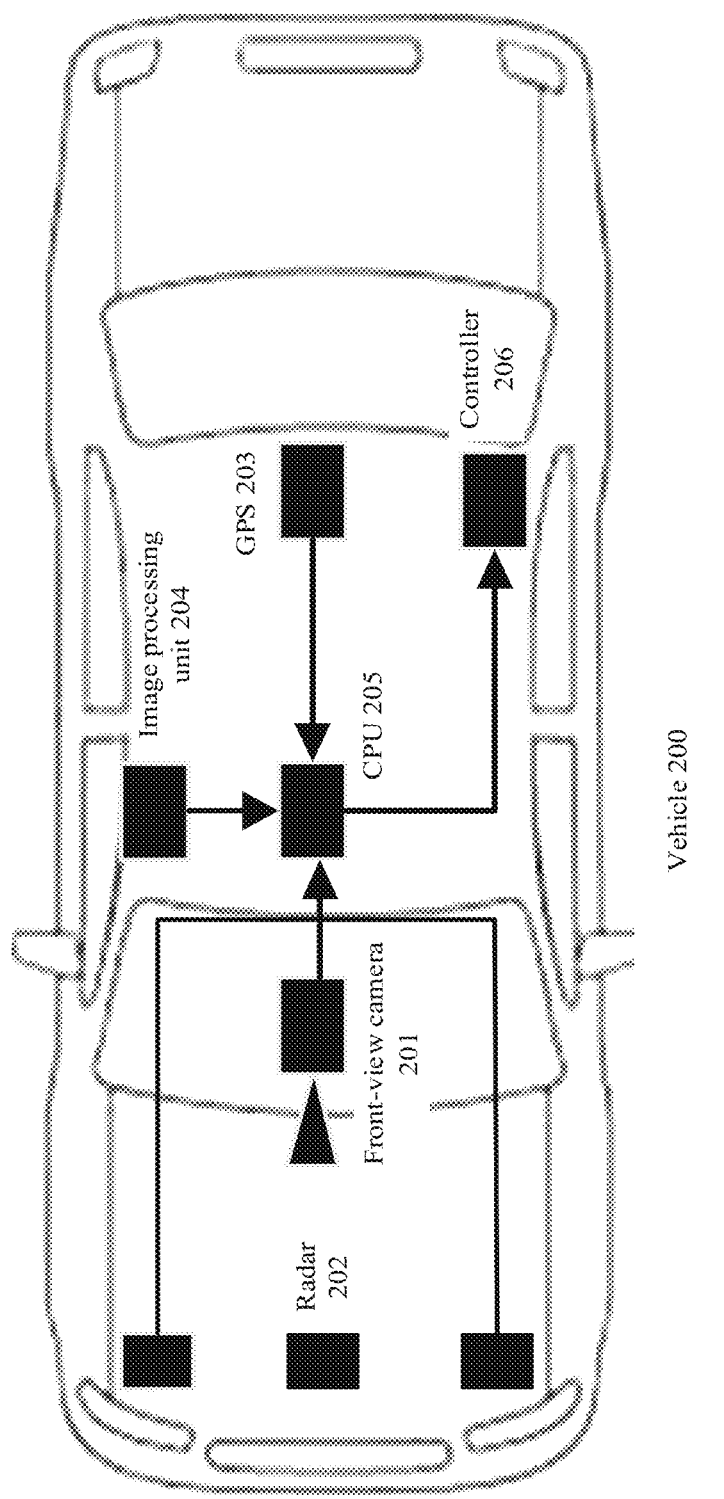
FIG. 2 is a schematic diagram of a hardware architecture of a vehicle that uses a self-driving technology or the like according to an embodiment of this application.

FIG. 2 is a schematic diagram of a hardware architecture of a system applied to a vehicle according to an embodiment of this application. The vehicle 200 includes a front-view camera 201, a radar 202, a Global Positioning System (GPS) 203, an image processing unit 204, a central processing unit (CPU) 205, and a controller 206. The front-view camera 201 may be configured to collect an image of a road scenario. The radar 202 may be configured to collect data of a dynamic surrounding object or a static surrounding object. The image processing unit 204 may be configured to recognize a lane line, a lane curb, another vehicle, and a surrounding object (for example, a pedestrian, an animal, or a tree). The CPU 205 may be configured to perform overall control on the entire vehicle 200 by performing the following operations: obtaining image data from the front-view camera 201 and status data of the surrounding object from the radar 202, invoking the image processor 204 to perform target recognition and invoking an internal computation module of the CPU 205 to perform fusion and other operations, determining an appropriate target vehicle speed, and generating a decision control instruction based on the target vehicle speed, and sending the decision control instruction to the controller 206. The controller 206 may be configured to control, based on the received decision control instruction, the vehicle to travel in a current lane at the target speed.

Figure 3:
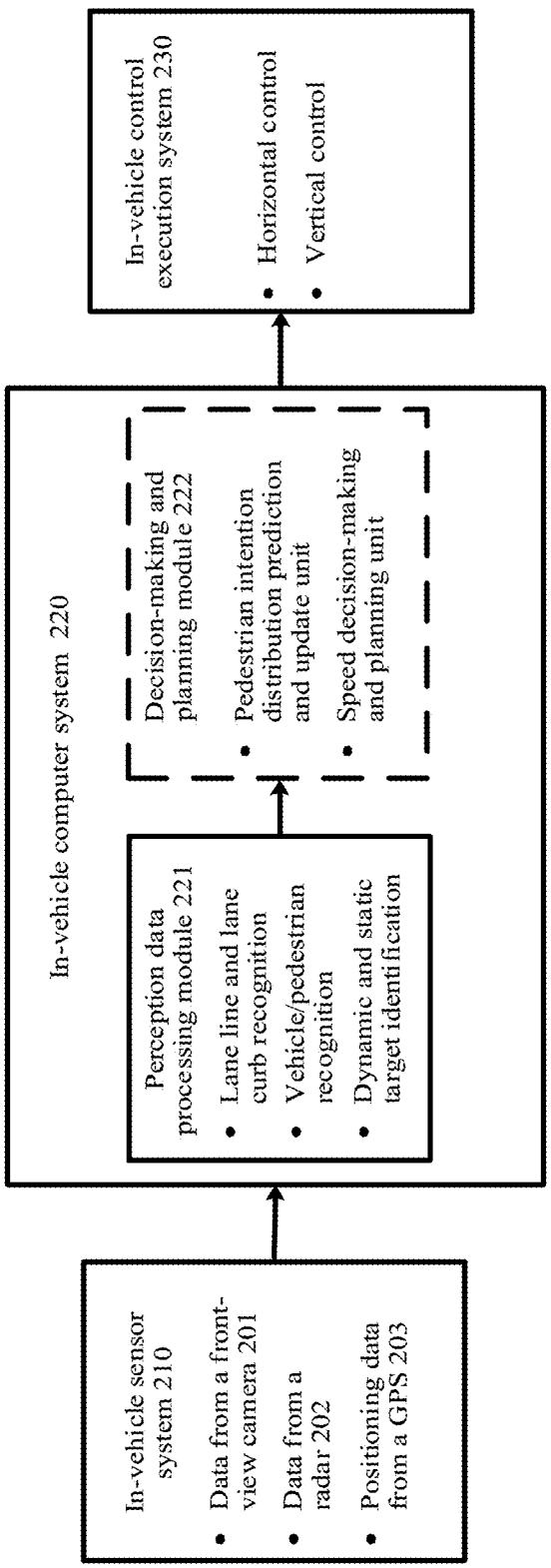
FIG. 3 is a schematic architectural diagram of a vehicle system that uses a self-driving technology or the like according to an embodiment of this application.

For the vehicle 200 of the hardware architecture shown in FIG. 2, a schematic diagram of a corresponding system architecture is shown in FIG. 3 according to an embodiment of this application. From a perspective of a system, the vehicle 200 includes an in-vehicle sensor system 210, an in-vehicle computer system 220, and an in-vehicle control execution system 230. The in-vehicle sensor system 210 may be configured to obtain data collected by the front-view camera 201, data collected by the radar 202, and data obtained through positioning by the GPS 203. The in-vehicle computer system 220 is generally divided into two modules: a perception data processing module 221 and a decision-making and planning module 222. The perception data processing module 221 may be configured to detect a surrounding object (especially a surrounding pedestrian) of the vehicle 200, and output a position and motion information of the surrounding object. The decision-making and planning module 222 may be configured to predict and update a distribution of action intentions of the surrounding object based on a current position and the motion information of the surrounding object, so as to decide and plan a vehicle speed of the vehicle 200 based on the distribution of action intentions. The in-vehicle control execution system 230 may be configured to obtain a decision control instruction output by the decision-making and planning module 222, and control the vehicle 200 to travel at a vehicle speed indicated in the decision control instruction. It should be noted that the method for determining a vehicle speed provided in this embodiment of this application is mainly performed by the decision-making and planning module 222 of in in-vehicle computer system 220. For a specific implementation, refer to related descriptions in the embodiment shown in FIG. 4.

Figure 4:
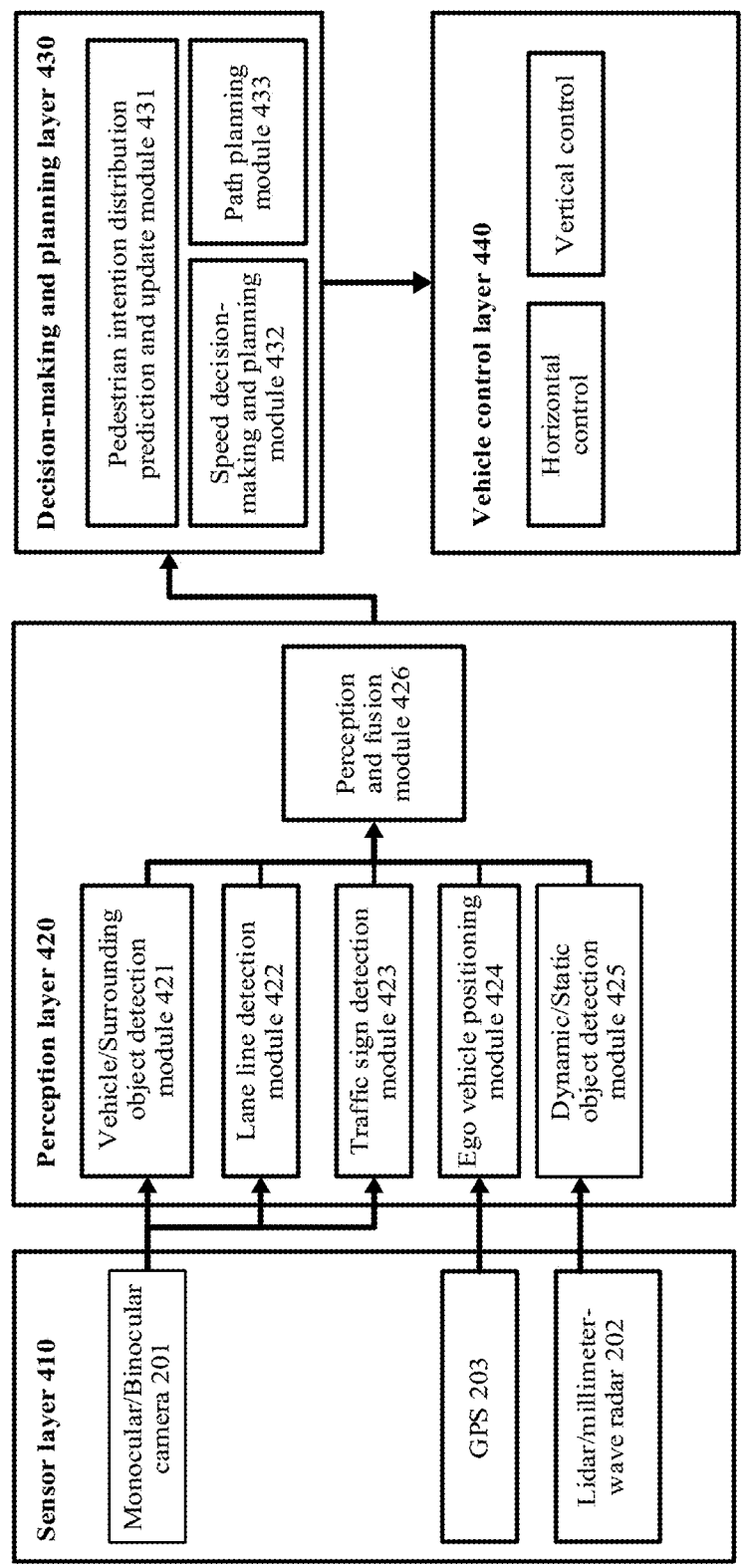
FIG. 4 is a schematic structural diagram of a vehicle that uses a self-driving technology or the like according to an embodiment of this application.

In an example, from a perspective of a product, a corresponding schematic structural diagram of the vehicle 200 in this embodiment of this application is shown in FIG. 4. The vehicle 200 includes a sensor layer 410, a perception layer 420, a decision-making and planning layer 430, and a vehicle control layer 440. A data stream sequentially arrives at the foregoing four layers, and is sequentially processed by the four layers. The sensor layer 410 may be configured to load the data collected by the monocular/binocular front-view camera 201, the data collected by the lidar/millimeter-wave radar 202, and the data obtained through positioning by the GPS 203. The perception layer 420 may be configured to load data obtained by the following six modules: a vehicle/surrounding object detection module 421, a lane line detection module 422, a traffic sign detection module 423, an ego vehicle positioning module 424, a dynamic/static object detection module 425, and a perception and fusion module 426. The decision-making and planning layer 430 may be configured to load data obtained by a pedestrian intention distribution prediction and update module 431, a speed decision-making and planning module 432, and a path planning module 433. The vehicle control layer 440 may be configured to perform horizontal and vertical control on the vehicle 200 based on data sent by the decision-making and planning layer 430. It should be noted that a module in a gray box in FIG. 4 is a module configured to implement the method for determining a vehicle speed provided in this embodiment of this application. In this embodiment of this application, whether a determined speed of the vehicle is safe and reliable mainly depends on the two modules 431 and 432 in gray in the decision-making and planning layer 430.

It may be understood that the foregoing scenario is merely an example of a scenario provided in this embodiment of this application, and this embodiment of this application is not limited to this scenario.

With reference to the accompanying drawings, the following describes in detail a specific implementation of a method for determining a vehicle speed in the embodiments of this application by using embodiments.

Figure 5:
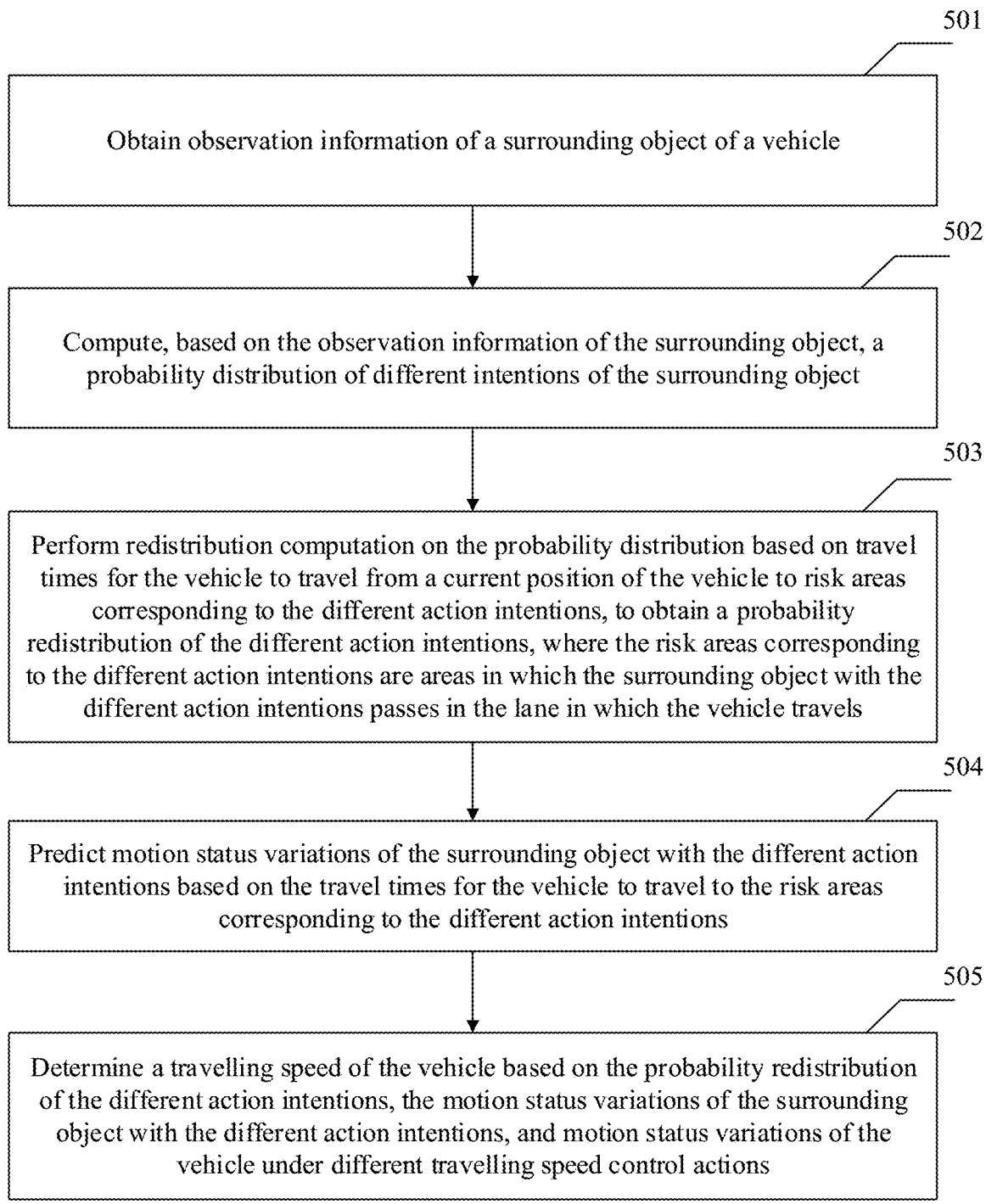
FIG. 5 is a schematic flowchart of a method for determining a vehicle speed according to an embodiment of this application.

FIG. 5 is a schematic flowchart of a method for determining a vehicle speed according to an embodiment of this application. The method may include the following step 501 to step 505.

Step 501: Obtain observation information of a surrounding object of a vehicle.

Step 502: Compute, based on the observation information of the surrounding object, a probability distribution of different action intentions of the surrounding object.

It may be understood that, in a driving environment of the vehicle, the surrounding object of the vehicle may include an object, for example, a pedestrian or an animal around the vehicle, that may participate in traffic. In this embodiment of this application, the surrounding object of the vehicle may be understood and described by using a pedestrian around the vehicle as an example. The observation information of the surrounding object is information that can reflect a status of the surrounding object, and can be used to predict a probability of each action intention of the surrounding object.

It may be understood that the action intention is an intention of the surrounding object relative to a current lane. For example, FIGS. 6A-6G are schematic diagrams of a plurality of intentions of a pedestrian. It can be learned that, in FIG. 6A shows an action intention g1: stepping forward along the sidewalk, FIG. 6B shows an action intention g2: stepping backward along the sidewalk, FIG. 6C shows an action intention g3: straight crossing the lane, FIG. 6D shows an action intention g4: diagonally crossing the lane in a driving direction, FIG. 6E shows an action intention g5: stepping away from the lane, FIG. 6F shows an action intention g6: diagonally crossing the lane in a direction opposite to a driving direction, and FIG. 6G shows an action intention g7: stop. In one case, if there is only one surrounding object around the vehicle, an action intention of a surrounding object means an action intention of the only one surrounding object. For example, it is assumed that the surrounding object of the vehicle is a pedestrian A. Assuming that each pedestrian has two possible action intentions: waiting and crossing, the action intention of the surrounding object includes two action intentions: A waits and A crosses the lane. In another case, if there are at least two surrounding objects around the vehicle, an action intention of a surrounding object means a combination of action intentions corresponding to each of the surrounding objects. For example, it is assumed that surrounding objects of the vehicle include a pedestrian A and a pedestrian B. Assuming that each pedestrian has two possible action intentions: waiting and crossing, action intentions of the surrounding objects include 2×2=4 action intention combinations: {A waits, B waits}, {A waits, B crosses the lane}, {A crosses the lane, B waits}, and {A crosses the lane, B crosses the lane}.

During specific implementation, a probability of each action intention of the surrounding object may be computed based on the obtained observation information of the surrounding object of the vehicle. The occurrence probability of each action intention of the surrounding object can be used to obtain the probability distribution of different action intentions of the surrounding object. The occurrence probability is a probability that each surrounding object has each action intention.

In an example, step 502 may include establishing, in a coordinate system that is based on the lane in which the vehicle travels, a relative position relationship between the surrounding object and the lane and a relative motion relationship between the surrounding object and the lane based on the observation information of the surrounding object, and computing the probability distribution of the different action intentions of the surrounding object based on the relative position relationship between the surrounding object and the lane and the relative motion relationship between the surrounding object and the lane.

It may be understood that, in the lane coordinate system (namely, an S-L coordinate system), a direction that uses a start point of the path as an origin and in which the vehicle is to travel in the lane is marked as a positive direction of an S axis, and a left direction perpendicular to the positive direction of the S axis is a positive direction of an L axis. For details, reference may be made to FIG. 7.

In some implementations, in step 501 and step 502, the occurrence probability of each action intention of the surrounding object may be predicted based on observation information of the surrounding object at a previous moment and observation information of the surrounding object at a next moment. Specific implementation may include: S11: Obtain the observation information of the surrounding object of the vehicle. S12: Determine whether each surrounding object is a new surrounding object, if the surrounding object is a new surrounding object, perform S13, if the surrounding object is not a new surrounding object, perform S14. S13: Initialize an occurrence probability of each action intention of the surrounding object. S14: Update an occurrence probability of each action intention of the surrounding object based on the observation information. It should be noted that, after the occurrence probability of each action intention of the surrounding object is determined, a probability distribution of different action intentions of the surrounding object may be determined based on the occurrence probability of each action intention.

It should be noted that the observation information, obtained in step 501 (namely, S11), of the surrounding object of the vehicle may be obtained in the following process. The front-view camera 201, the radar 202, or the GPS 203 in FIG. 2, FIG. 3, or FIG. 4 collects the observation information. The observation information is sent to the vehicle/surrounding object detection module 421, the ego vehicle positioning module 424, and the dynamic/static object detection module 425 of the perception layer 420 in FIG. 4 for separate processing. Then, three processing results are sent to the perception and fusion module 426 for data association fusion and tracking processing. Step 502 (namely, S12 to S14) may be implemented by the CPU 205 (the decision-making and planning module 222 in the in-vehicle computer system 220 in FIG. 3 or the pedestrian intention distribution prediction and update module 431 in the decision-making and planning layer 430 in FIG. 4) in FIG. 2.

In an example, S11 may include obtaining first observation information of the surrounding object in the rectangular coordinate system by performing processing such as filtering, multi-sensor data association and fusion, and tracking on collected data of an environment around the vehicle. The first observation information of the surrounding object may include a position of the surrounding object, a motion speed of the surrounding object, and a motion heading of the surrounding object. It should be noted that, for each surrounding object participating in traffic, first observation information of the surrounding object needs to be obtained. To provide a data foundation for subsequent computation, first observation information of the ego vehicle also needs to be obtained, including a vehicle position, a vehicle speed, a vehicle acceleration, and a vehicle course.

The traffic scenario shown in FIG. 1 is still used as an example. First observation information of the pedestrian 102 may be obtained through S11 and may be represented as: $O_{pedestrian\ 102} = \{$position: $(x_{pedestrian\ 102}, y_{pedestrian\ 102})$, motion speed: $V_{pedestrian\ 102}$, motion heading: $\theta_{pedestrian\ 102}\}$. First observation information of the pedestrian 103 may be represented as: $O_{pedestrian\ 103} = \{$position: $(x_{pedestrian\ 103}, y_{pedestrian\ 103})$, motion speed: $V_{pedestrian\ 103}$, motion heading: $\theta_{pedestrian\ 103}\}$. First observation information of the vehicle 101 may be represented as: $O_{vehicle\ 101} = \{$position: $(x_{vehicle\ 101}, y_{vehicle\ 101})$, speed: $V_{vehicle\ 101}$, acceleration: $a_{vehicle\ 101}$, course: $\theta_{vehicle\ 101}\}$.

Figure 7:
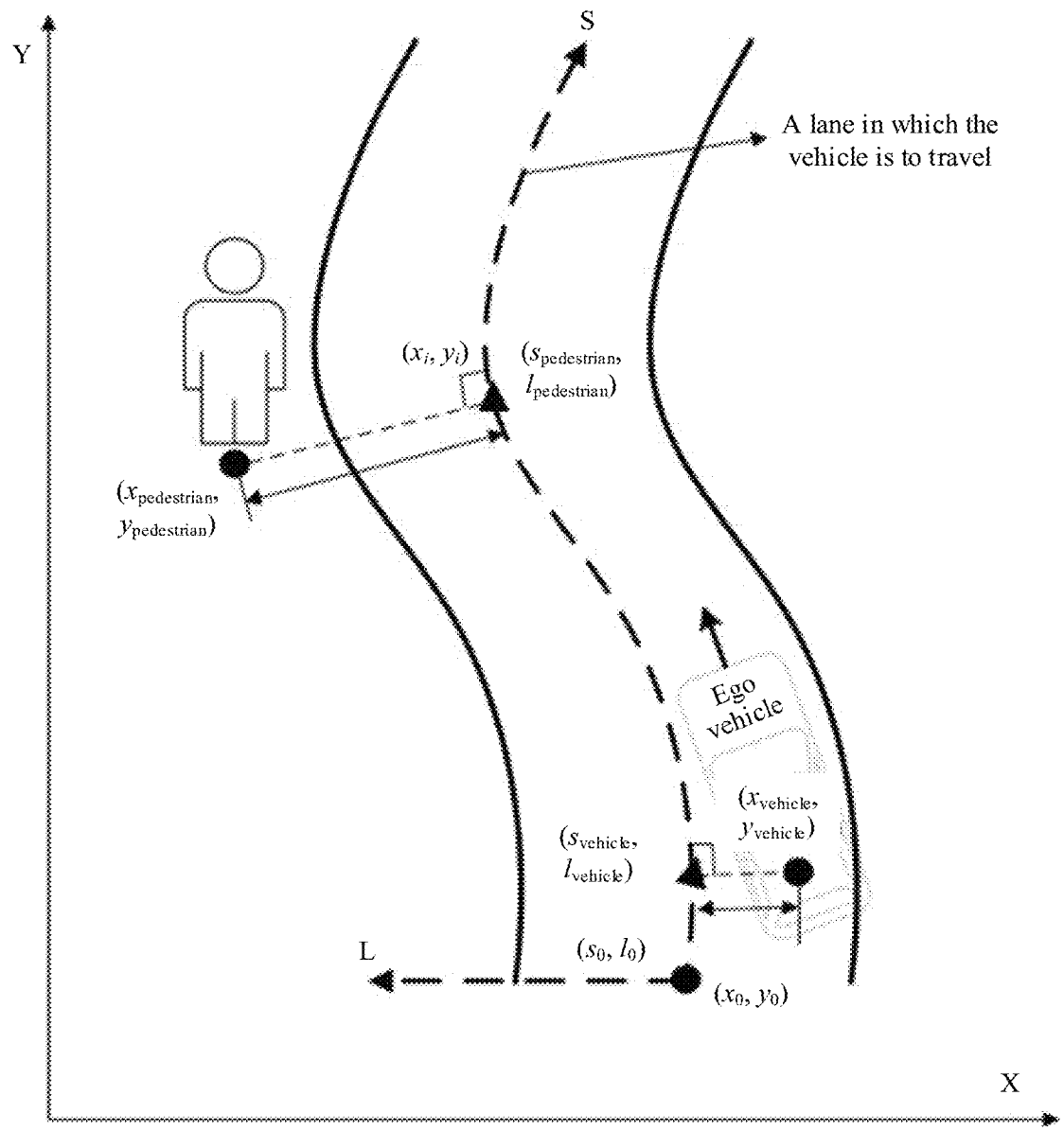
FIG. 7 is a schematic diagram of a vehicle-surrounding object-lane model according to an embodiment of this application.

During specific implementation, to consider, from a perspective of the vehicle, whether the surrounding object has a possibility of entering the lane in which the vehicle is to travel, the surrounding object needs to be observed in the S-L coordinate system. In this case, a position in the first observation information needs to be transformed from the rectangular coordinate system to a position, in the S-L coordinate system, that is used as a position in second observation information. A specific transformation may include vertically mapping the original position in the rectangular coordinate system to a mapping point in a direction of the lane in which the vehicle is to travel, obtaining a distance between the start point of the driving lane and the mapping point, and using the distance as a value in the S axis direction, and computing a distance between the original position and the mapping point, and using the distance as a value in the L axis direction. Referring to FIG. 7, a vehicle-surrounding object-lane model may be constructed. The vehicle-surrounding object-lane model uses the S-L coordinate system as a reference coordinate system, and is used to describe a relative position relationship between the vehicle and the lane and a relative motion relationship between the vehicle and the lane, and a relative position relationship between the surrounding object and the lane and a relative motion relationship between the surrounding object and the lane. Therefore, the vehicle-surrounding object-road model may be used to compute the second observation information. For example, for a pedestrian and a vehicle shown in FIG. 7, it is assumed that first observation information of the pedestrian includes a position $(x_{pedestrian}, y_{pedestrian})$, and first observation information of the vehicle includes a position $(x_{vehicle}, y_{vehicle})$. In this case, referring to FIG. 7, a position, in the S-L coordinate system, to which the pedestrian position is transformed is $(s_{pedestrian}, l_{pedestrian})$, and a position, in the S-L coordinate system, to which the vehicle position is transformed is $(s_{vehicle}, l_{vehicle})$.

The traffic scenario shown in FIG. 1 is still used as an example. Second observation information of the pedestrian 102 may be obtained through S11 and may be represented as: $O_{pedestrian\ 102}' = \{(s_{pedestrian\ 102}, l_{pedestrian\ 102}), V_{pedestrian\ 102}, \theta_{pedestrian\ 102}\}$. Second observation information of the pedestrian 103 may be represented as: $O_{pedestrian\ 103}' = \{(s_{pedestrian\ 103}, l_{pedestrian\ 103}), V_{pedestrian\ 103}, \theta_{pedestrian\ 103}\}$. Second observation information of the vehicle 101 may be represented as: $O_{vehicle\ 101}' = \{(s_{vehicle\ 101}, l_{vehicle\ 101}), V_{vehicle\ 101}, a_{vehicle\ 101}, \theta_{vehicle\ 101}\}$.

It should be noted that, after the observation information of the surrounding object of the vehicle is obtained according to the foregoing implementation, S12 may be performed to determine whether each surrounding object is a new surrounding object. For the new surrounding object, an occurrence probability of each intention of the surrounding object is initialized according to S13. For an existing surrounding object, an occurrence probability of each intention of the surrounding object is updated based on the observation information according to S14. It may be understood that in both S13 and S14, the probability is obtained through computation based on the relative position relationship between the surrounding object and the lane and the relative motion relationship between the surrounding object and the lane.

For S12, whether the surrounding object is a new surrounding object may be determined by determining whether the surrounding object observed at a current moment has been observed before the current moment. If the surrounding object observed at the current moment has not been observed before the current moment, it indicates that the surrounding object is a new object that appears around the vehicle, and it may be determined that the surrounding object is a new surrounding object. On the contrary, if the surrounding object observed at the current moment has also been observed before the current moment, it indicates that the surrounding object exists before the current moment, and it may be determined that the surrounding object is not a new surrounding object.

In S13, an occurrence probability of a new surrounding object is initialized. Because the surrounding object is newly observed, and there is no other data foundation of an action intention of the surrounding object, the occurrence probability may be determined based on a quantity of possible action intentions of the surrounding object. In other words, the occurrence probability of each possible action intention is equal. For example, assuming that a new surrounding object A has seven possible action intentions, occurrence probabilities of all of the seven predicted action intentions are equal, that is, 1/7.

For S14, the occurrence probability of each intention of the surrounding object is updated based on the observation information. Further, the occurrence probability of each action intention of the surrounding object may be determined based on an occurrence probability of the action intention at a moment closest to the current moment, a position of the surrounding object at the current moment and a position of the surrounding object at the moment closest to the current moment, and means and corresponding variances of an update model of the action intention in the S direction and the L direction in the S-L coordinate system. For example, the update model may be a Gaussian motion model.

For example, it is assumed that only the pedestrian 102 can be observed at a moment when t=0, and the pedestrian 102 and the pedestrian 103 can be observed at a moment when t=1. At the moment when t=0, the observation information of the pedestrian 102 in the rectangular coordinate system is obtained as $O_{pedestrian\ 102}^{t=0} = \{x_{pedestrian\ 102}^{t=0}, y_{pedestrian\ 102}^{t=0}, v_{pedestrian\ 102}^{t=0}, \theta_{pedestrian\ 102}^{t=0}\}$. If the pedestrian 102 is determined, through S12, as a new surrounding object, a status of the pedestrian 102 and a distribution of occurrence probabilities of action intentions of the pedestrian 102 need to be initialized. A specific operation may include using a path, path=$\{(x_0, y_0), (x_1, y_1), (x_2, y_2), \ldots, (x_n, y_n)\}$ on which the vehicle is to travel as a reference coordinate system (where n is a quantity of points included in the reference coordinate system), computing a point $(x_i, y_i)$ of a position $(x_{pedestrian\ 102}^{t=0}, y_{pedestrian\ 102}^{t=0})$ of the pedestrian 102 projected on the path, and computing a distance $s_{pedestrian\ 102}^{t=0}$, along the path, between a start point $(x_0, y_0)$ of the path and the projected point $(x_i, y_i)$, and computing a distance $l_{pedestrian\ 102}^{t=0}$ between $(x_{pedestrian\ 102}^{t=0}, y_{pedestrian\ 102}^{t=0})$ and the projected point $(x_i, y_i)$. In this case, an initialized status of the pedestrian 102 may be $\{s_{pedestrian\ 102}^{t=0}, l_{pedestrian\ 102}^{t=0}, v_{pedestrian\ 102}^{t=0}, b_{pedestrian\ 102}^{t=0}\}$, where $b_{pedestrian\ 102}^{t=0}$ is the distribution of occurrence probabilities of the plurality of action intentions of the pedestrian 102 at the moment when t=0. Because the pedestrian 102 is a new surrounding object, it is determined that $b_{pedestrian\ 102}^{t=0} = \{P_{pedestrian\ 102}^{t=0}(g1) = P_{pedestrian\ 102}^{t=0}(g2) = P_{pedestrian\ 102}^{t=0}(g3) = P_{pedestrian\ 102}^{t=0}(g4) = P_{pedestrian\ 102}^{t=0}(g5) = P_{pedestrian\ 102}^{t=0}(g6) = P_{pedestrian\ 102}^{t=0}(g7) = 1/7\}$. The action intentions of the pedestrian 102 include seven action intentions g1 to g7, and probabilities of all the action intentions are equal (that is, 1/7). It may be understood that $P_{pedestrian\ 102}^{t=0}(g1)$ represents a probability that the pedestrian 102 has the action intention g1 at the moment t=0, $P_{pedestrian\ 102}^{t=0}(g2)$ represents a probability that the pedestrian 102 has the action intention g2 at the moment t=0, and so on. Details are not described herein.

At the moment t=1, the observation information of the pedestrian 102 and the observation information of the pedestrian 103 in the rectangular coordinate system are respectively $O_{pedestrian\ 102}^{t=1} = \{x_{pedestrian\ 102}^{t=1}, y_{pedestrian\ 102}^{t=1}, v_{pedestrian\ 102}^{t=1}, \theta_{pedestrian\ 102}^{t=1}\}$ and $O_{pedestrian\ 103}^{t=1} = \{x_{pedestrian\ 103}^{t=1}, y_{pedestrian\ 103}^{t=1}, v_{pedestrian\ 103}^{t=1}, \theta_{pedestrian\ 103}^{t=1}\}$. After determining in S12, if it is determined that the pedestrian 103 is a new surrounding object, a status of the pedestrian 103 and a distribution of action intentions of the pedestrian 103 need to be initialized, and if it is determined that the pedestrian 102 is an existing surrounding object, an occurrence probability of each action intention of the pedestrian 102 is updated based on the observation information. For a process of initializing the status and the distribution of intentions of the pedestrian 103, refer to the description of the initialization process for the pedestrian 102 at the moment t=0. Details are not described herein again. A process of updating each action intention of the pedestrian 102 may include the following steps: Step 1: Obtain a position and a speed $s_{pedestrian\ 102}^{t=1}$, $l_{pedestrian\ 102}^{t=1}$, $v_{pedestrian\ 102}^{t=1}$ of the pedestrian 102 in the S-L coordinate system at the moment t=1 through vertical projection and distance computation based on the observation information $O_{pedestrian\ 102}^{t=1} = \{x_{pedestrian\ 102}^{t=1}, y_{pedestrian\ 102}^{t=1}, v_{pedestrian\ 102}^{t=1}, \theta_{pedestrian\ 102}^{t=1}\}$ of the pedestrian 102. Step 2: Update a distribution $b_{pedestrian\ 102}^{t=1}$ of action intentions of the pedestrian 102 at the moment t=1 according to the Gaussian motion model. Further, an occurrence probability of each action intention is updated. For step 2, the occurrence probability of the action intention g1 at the moment t=1 is used as an example for description. Further, an occurrence probability of the action intention g1 at the moment t=1 after the update may be computed according to the following formula (1):

$$P_{102}^{t=1}(g1) = P_{102}^{t=0}(g1) \times P_s^{g1} \times P_l^{g1} \quad \text{formula (1)},$$

where $P_s^{g1}$ and $P_l^{g1}$ may be obtained through computation according to the following formula (2):

$$\begin{cases} P_s^{g1} = \dfrac{1}{\sqrt{2\pi}\,\sigma_s} \exp\left(-\dfrac{[(s_{pedestrian\ 102}^{t=1} - s_{pedestrian\ 102}^{t=0}) - \mu_s^{g1}]^2}{2\sigma_s^2}\right) \\ p_l^{g1} = \dfrac{1}{\sqrt{2\pi}\,\sigma_l} \exp\left(-\dfrac{[(l_{pedestrian\ 102}^{t=1} - l_{pedestrian\ 102}^{t=0}) - \mu_l^{g1}]^2}{2\sigma_l^2}\right) \end{cases}, \quad \text{formula (2)}$$

where $\mu_s^{g1}$ and $\mu_l^{g1}$ are means of the action intention g1 of the pedestrian 102 in the S direction and the L direction in the S-L coordinate system by using the Gaussian motion model. $\sigma_s$ and $\sigma_l$ are standard deviations of the action intention g1 of the pedestrian 102 in the S direction and the L direction in the S-L coordinate system by using the Gaussian motion model.

It may be understood that a manner of updating occurrence probabilities of the action intentions g2 to g7 of the pedestrian 102 at the moment t=1 is similar to the manner of updating the occurrence probability of the action intention g1 at the moment t=1. Details are not described herein again. After the update, at the moment t=1, a distribution of occurrence probabilities of the action intentions of the pedestrian 102 may be represented as $b_{pedestrian\ 102}^{t=1} = \{P_{pedestrian\ 102}^{t=1}(g1), P_{pedestrian\ 102}^{t=1}(g2), P_{pedestrian\ 102}^{t=1}(g3), P_{pedestrian\ 102}^{t=1}(g4), P_{pedestrian\ 102}^{t=1}(g5), P_{pedestrian\ 102}^{t=1}(g6), P_{pedestrian\ 102}^{t=1}(g7)\}$. It may be understood that, $P_{pedestrian\ 102}^{t=1}(g1)$ represents a probability that the pedestrian 102 has the action intention g1 at the moment t=1, $P_{pedestrian\ 102}^{t=1}(g2)$ represents a probability that the pedestrian 102 has the action intention g2 at the moment t=1, and so on. Details are not described herein.

It should be noted that, in a manner of computing the distribution of occurrence probabilities of the action intentions of the pedestrian 102, to cover more surrounding objects and comprehensively compute an occurrence probability of each possible action intention of each surrounding object, a concept of a particle may be introduced. An occurrence probability of each action intention is represented by a quantity of particles included in the action intention. Further, if the action intention g1 includes a large quantity of particles, it indicates that the occurrence probability of the action intention is relatively high. On the contrary, if the action intention g1 includes a small quantity of particles, it indicates that the occurrence probability of the action intention is relatively low.

Figure 8:
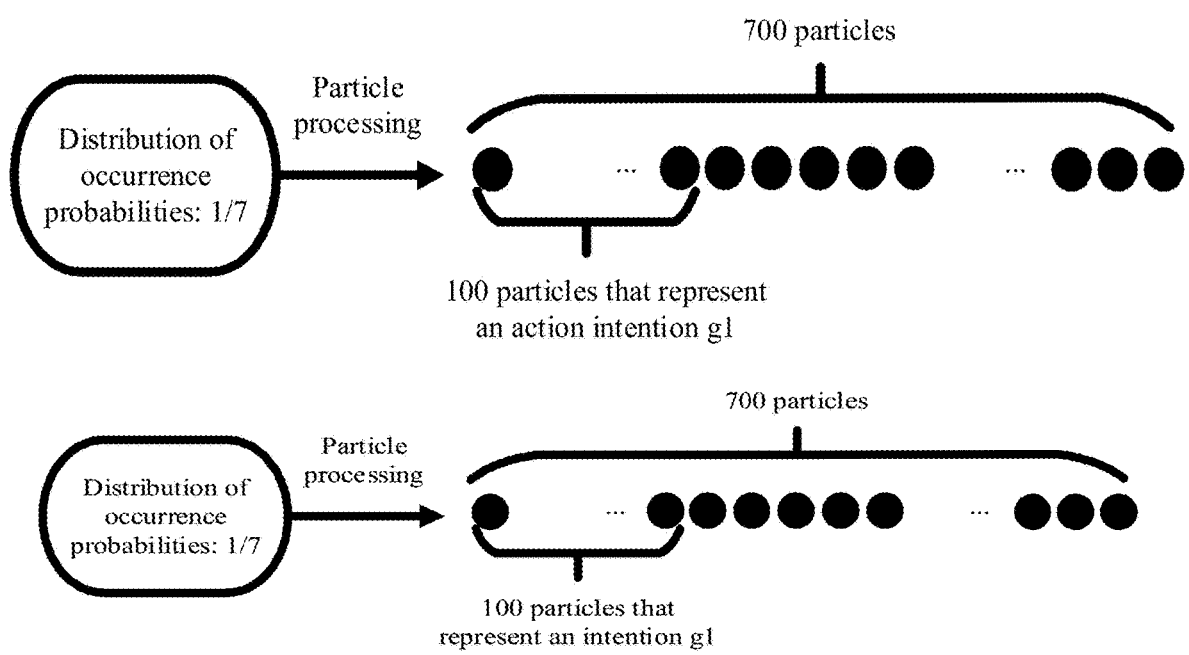
FIG. 8 is a schematic diagram of particlezation representation according to an embodiment of this application.

For example, in the corresponding example of S13 in the foregoing first implementation, the distribution of occurrence probabilities of the action intentions is initialized as $b_{pedestrian\ 102}^{t=0} = \{P_{pedestrian\ 102}^{t=0}(g1) = P_{pedestrian\ 102}^{t=0}(g2) = P_{pedestrian\ 102}^{t=0}(g3) = P_{pedestrian\ 102}^{t=0}(g4) = P_{pedestrian\ 102}^{t=0}(g5) = P_{pedestrian\ 102}^{t=0}(g6) = P_{pedestrian\ 102}^{t=0}(g7) = 1/7\}$ at the moment t=0. In this case, the distribution of occurrence probabilities may be represented by using particles of a preset quantity (namely, an integer multiple of a quantity of all action intentions, for example, 700). As shown in FIG. 8, each action intention corresponds to a particle set that includes a same quantity of particles. For example, for 700 particles that include seven action intentions, an occurrence probability of each action intention is 1/7. Therefore, each action intention corresponds to a set of 100 same particles, and a weight of each particle is 1/700.

A status of one of the 700 particles may be represented as particle=$\{s_{vehicle}, l_{vehicle}, v_{vehicle}, s_{pedestrian\ j}, l_{pedestrian\ j}, v_{pedestrian\ j}, g_{pedestrian\ j}, w\}$, where j represents a $j^{th}$ surrounding object of the vehicle, and w represents a weight of the particle. A set of particles may be expressed as $\{particle^1, particle^2, \ldots, particle^m\}$, where m is a total quantity of particles, namely, 700. For example, for a vehicle and surrounding objects a pedestrian 1 and a pedestrian 2 of the vehicle, a status of each particle may be represented as $$particle^i = \left\{ \begin{array}{l} s_{vehicle}, l_{vehicle}, v_{vehicle}, s_{pedestrian\ 1}, l_{pedestrian\ 1}, v_{pedestrian\ 1}, \\ g^i_{pedestrian\ 1}, s_{pedestrian\ 2}, l_{pedestrian\ 2}, v_{pedestrian\ 2}, g^i_{pedestrian\ 2}, w^i \end{array} \right\}$$

where wi represents a weight of a $particle^i$, and the weight is used to represent a risk degree of an action intention corresponding to the particle. For specific descriptions, refer to related descriptions in the following step 503 to step 505.

In some other implementations, in step 501 and step 502, a probability distribution of action intentions of the surrounding object may be output based on the observation information of the current surrounding object by using a trained machine learning model. The observation information of the surrounding object may be observation information that is processed in the foregoing implementation and that includes a position, a motion speed, and a motion heading of the surrounding object, or may be a currently collected image including the surrounding object.

In this implementation, in a case, if the observation information is the foregoing processed observation information that includes the position, the motion speed, and the motion heading of the surrounding object, a first machine learning model may be trained and pre-constructed based on a large amount of historical observation information corresponding to a learned occurrence probability of each action intention, and the corresponding learned occurrence probability of each action intention, to obtain a first machine learning model that has been trained. Then, the observation information that is of the surrounding object and that is obtained in step 501 may be input into the first machine learning model that has been trained, and an occurrence probability of each action intention of the surrounding object is output.

In another case, if the observation information is a currently collected image including the surrounding object, a second machine learning model may be trained and pre-constructed based on a large quantity of historical images corresponding to a learned occurrence probability of each action intention, and the corresponding learned occurrence probability of each action intention, to obtain a second machine learning model that has been trained. Then, the observation information (namely, the currently collected image including the surrounding object) that is of the surrounding object and that is obtained in step 501 may be input into the second machine learning model that has been trained, and an occurrence probability of each action intention of the surrounding object included in the image is output.

It may be understood that, in both of the foregoing two implementations, an occurrence probability of each of a plurality of action intentions of the surrounding object can be predicted based on the observation information of the surrounding object. This provides an indispensable data foundation for subsequent accurate determining of a vehicle speed of the vehicle, and therefore improves safety and reliability of the vehicle that uses intelligent driving technologies such as a self-driving technology.

Step 503: Perform redistribution computation on the probability distribution based on travel times for the vehicle to travel from a current position of the vehicle to risk areas corresponding to the different action intentions, to obtain a probability redistribution of the different action intentions, where the risk areas corresponding to the different action intentions are areas in which the surrounding object with the different action intentions passes in the lane in which the vehicle travels.

Step 504: Predict motion status variations of the surrounding object with the different action intentions based on the travel times for the vehicle to travel to the risk areas corresponding to the different action intentions.

It may be understood that, to ensure that a determined vehicle speed is more secure and reliable, the vehicle speed of the vehicle needs to be determined based on at least the probability redistribution of the action intentions of the surrounding object and the motion status variations of the surrounding object with the different action intentions. Both the probability redistribution of the action intentions of the surrounding object and the motion status variations of the surrounding object need to be obtained through computation based on the travel times for the vehicle to travel to the risk areas corresponding to different action intentions of the surrounding object. The travel time is used to quantize a risk degree of each action intention, namely, a possibility of a collision with the vehicle when the rounding object moves with the action intention.

Figure 9:
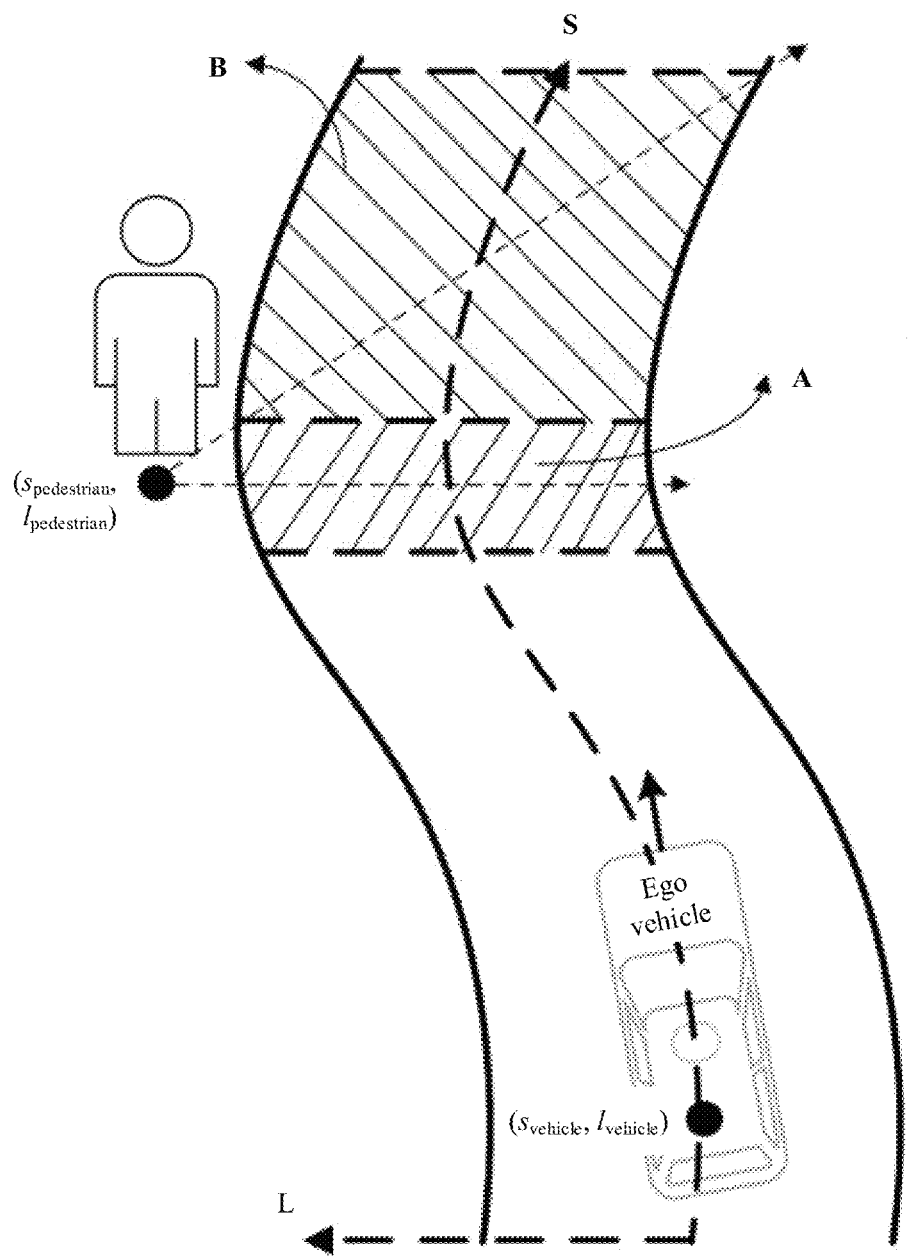
FIG. 9 is a schematic diagram of determining a risk area and a travel time according to an embodiment of this application.

It may be understood that a time to collision under each action intention is the travel time required for the vehicle to travel to the risk area corresponding to each action intention of the surrounding object. For example, as shown in FIG. 9, for the action intention g3 (namely, straight crossing the lane) of a pedestrian, a risk area is an area A in which the pedestrian with the intention of straight crossing the lane passes in the lane in which the vehicle travels. In this case, a corresponding time to collision is a travel time $ttc_{g3}$ required for the vehicle to travel from a current position to the area A. For the action intention g4 (namely, diagonally crossing the lane in a driving direction) of the pedestrian, a risk area is an area B in which the pedestrian with the intention of straight crossing the lane in the lane in which the vehicle travels. In this case, a corresponding time to collision is a travel time $ttc_{g4}$ required for the vehicle to travel from the current position to the area B.

In some implementations, before step 503, in this embodiment of this application, the travel times for the vehicle to travel from the current position of the vehicle to the risk areas corresponding to the different action intentions may be further computed in step 501 and the following S21 to S24: S21: Obtain the observation information of the vehicle. S22: Establish, in a coordinate system that is based on the lane in which the vehicle travels, a relative position relationship between the vehicle and the lane and a relative motion status between the vehicle and the lane, and a relative position relationship between the surrounding object and the lane and a relative motion status between the surrounding object and the lane based on the observation information of the vehicle and the observation information of the surrounding object. S23: Determine, based on the relative position relationship between the surrounding object and the lane and the relative motion status between the surrounding object and the lane, the risk areas corresponding to the different action intentions. S24: Compute, based on the relative position relationship between the vehicle and the lane and the relative motion status between the vehicle and the lane, and the risk areas corresponding to the different action intentions, the travel times for the vehicle to travel from the current position of the vehicle to the risk areas corresponding to the different action intentions. For specific implementation of S21, refer to the related descriptions of obtaining the observation information of the surrounding object in step 501. For specific implementation of S22, refer to the related descriptions of transformation between coordinate systems in S11.

It may be understood that, for an action intention, if a time to collision under the action intention is long, it indicates that a probability of a risk that occurs under the action intention is low, that is, a risk degree is low. On the contrary, if a time to collision under the action intention is short, it indicates that a probability of a risk occurred under the action intention is relatively high, that is, a risk degree is high. For example, for the pedestrian in FIG. 9, $ttc_{g4}$ is clearly greater than $ttc_{g3}$, indicating that if the pedestrian straight crosses the lane, there is a high probability that the pedestrian collides with the vehicle, and a risk degree is high. However, if the pedestrian diagonally crosses the lane in a driving direction, compared with the high collision probability under the action intention of straight crossing the lane, a possibility of collision with the vehicle is reduced, and a risk degree is reduced.

In an example, after the time to collision is determined, step 503 may be further implemented through the following S31 to S32: S31: Perform particle processing on the probability distribution, where quantities of particles corresponding to the different action intentions are used to represent the probability distribution of the different action intentions. S32: Adjust, based on the travel times that are obtained through computation and that are required for the vehicle to travel to the risk areas corresponding to the different action intentions, weights of the particles corresponding to the different action intentions, to obtain the probability redistribution of the different action intentions.

For details of S31, refer to FIG. 8 and the related descriptions in the foregoing embodiment. Details are not described herein again.

For computation of the travel times for the vehicle to travel to the risk areas corresponding to the different action intentions in S32, refer to the foregoing descriptions of related parts in S21 to S24. A specific principle is not described herein again. For clearer description, the following uses an example to describe an example process of computing the travel time after particle processing. For example, it is assumed that for the vehicle and the pedestrian 1 and the pedestrian 2 around the vehicle, for a particle i, $particle^i = \{s_{vehicle}, l_{vehicle}, v_{vehicle}, S_{pedestrian\ 1}, l_{pedestrian\ 1}, v_{pedestrian\ 1}, g_{pedestrian\ 1}^i, S_{pedestrian\ 2}, l_{pedestrian\ 2}, v_{pedestrian\ 2}, g_{pedestrian\ 2}^i/w^i\}$. Under a same action intention a $g_{pedestrian}^i$, a risk area of the pedestrian 1 is determined, and a travel time $ttc_{pedestrian\ 1}^i$ required for the vehicle to travel to the risk area corresponding to the action intention of the pedestrian 1 is computed, and a risk area of the pedestrian 2 is determined, and a travel time $ttc_{pedestrian\ 2}^i$ required for the vehicle to travel to the risk area corresponding to the action intention of the pedestrian 2 is computed. To maximally reduce a collision possibility for the pedestrian 1 and the pedestrian 2, a smaller travel time in travel times corresponding to pedestrians is selected as a travel time $ttc^i$ of the particle i, that is, $ttc^i = \min(ttc_{pedestrian\ 1}^i, ttc_{pedestrian\ 2}^i)$.

In S32, the weights of the particles corresponding to the different action intentions are adjusted based on the travel times that are obtained through computation and that are required for the vehicle to travel to the risk areas corresponding to the different action intentions, to obtain the probability redistribution of the different action intentions. A travel time (namely, a time to collision) of each particle represents a risk degree of a collision of the surrounding object with a specific intention, and a shorter travel time indicates a higher risk degree. Therefore, to increase attention to an action intention of a high risk degree, a weight of a particle with a high risk degree may be increased based on the travel time according to the following formula (3):

$$w_{new1}^i = w^i * \frac{W}{ttc^i + \varepsilon}, \quad \text{formula (3)}$$

where W represents a risk coefficient, and ε represents an effective computation constant. A smaller travel time $tt_{ci}$ indicates a larger weight of a particle, obtained through computation, that indicates a risk degree of the particle. In this way, the risk degree of the particle can be highlighted. In addition, in order that computation can be converged, normalization processing may be further performed on the weight $w_{new1}^i$. Further, a weight $w_{new2}^i$ of the particle i may be computed according to the following formula (4):

$$w_{new2}^i = \frac{w^i * \frac{W}{ttc^i + \varepsilon}}{\sum_{i=1}^{m} w^i * \frac{W}{ttc^i + \varepsilon}}. \quad \text{formula (4)}$$

It may be understood that, according to the foregoing description, a risk degree of each action intention can be determined based on the travel time required for the vehicle to travel to the risk area corresponding to each action intention. In other words, the probability redistribution of the different action intentions can be implemented. This provides an indispensable data foundation for subsequent accurate determining of the vehicle speed of the vehicle, and therefore improves safety and reliability of the vehicle that uses intelligent driving technologies such as a self-driving technology.

In an example, in step 504, the motion status variations of the surrounding object with the different action intentions may be predicted through the following S41 and S42: S41: Determine, based on the travel times for the vehicle to travel to the risk areas corresponding to the different action intentions, probabilities that the surrounding object with the different action intentions changes the action intention. S42: Predict the motion status variations of the surrounding object with the different action intentions based on the probabilities that the surrounding object with the different action intentions changes the action intention and a random probability.

It may be understood that, in S41, an interaction probability related to the vehicle and the surrounding object may be further determined based on a time to collision (ttc) under each action intention. In one case, if an interaction probability under an action intention of the surrounding object is excessively high, the action intention may be changed, based on the interaction probability, to a target intention. The target intention is an action intention of the surrounding object after adjustment. For example, if an interaction probability corresponding to a ttc under the action intention g1 of the pedestrian 1 is quite high, the action intention g2 may be determined as the target intention of the pedestrian 1 based on the interaction probability. In another case, if an interaction probability under an action intention of the surrounding object is relatively low, it may be determined, based on the interaction probability, that the action intention is still the target intention. The target intention is the action intention of the surrounding object before adjustment. For example, if an interaction probability corresponding to a ttc under the action intention g1 of the pedestrian 1 is quite low, the action intention g1 may be determined as the target intention of the pedestrian 1 based on the interaction probability.

It may be understood that, if a time to collision between the surrounding object and the vehicle is relatively short when the surrounding object has a specific action intention, that is, a risk degree is relatively high, the surrounding object is generally cautious. On the contrary, if a time to collision between the surrounding object and the vehicle is relatively long when the surrounding object has a specific action intention, that is, a risk degree is relatively low, the surrounding object is generally relaxed. In view of this, the interaction probability obtained through computation based on the ttc is introduced, so that a motion status that matches psychology of the pedestrian can be realistically simulated. During specific implementation, it is assumed that a time to collision between the pedestrian 1 and the vehicle is $ttc_{pedestrian\ 1}^i$, and a time to collision between the pedestrian 2 and the vehicle is $ttc_{pedestrian\ 2}^i$. For example, an interaction probability related to the pedestrian 1 and the vehicle may be $$Pr(\text{pedestrian } 1^\wedge \text{vehicle}) = \frac{W_{interact}}{ttc_{pedestrian\ 1}^i + W_{interact}}.$$

Likewise, an interaction probability related to the pedestrian 2 and the vehicle may be $$Pr(\text{pedestrian } 2^\wedge \text{vehicle}) = \frac{W_{interact}}{ttc_{pedestrian\ 2}^i + W_{interact}},$$

where $W_{interact}$ is an interaction probability coefficient.

During specific implementation, in S42, whether to use a surrounding object interactive motion model or a surrounding object linear motion model is determined based on a surrounding object status prediction model and the computed interaction probability, to determine the motion status variation of the surrounding object. The pedestrian behaves at random and an interaction probability related to the pedestrian and the vehicle is also random. Therefore, a random probability $P_{random}$ is introduced to determine a model that is supposed to be used to compute an initial expectation value. A specific determining process includes the following steps: Step 1: Determine whether the interaction probability $P_r$ is greater than the random probability $P_{random}$. If the interaction probability Pr is greater than the random probability $P_{random}$, perform step 2, or if the interaction probability $P_r$ is not greater than the random probability $P_{random}$, perform step 3. Step 2: Predict the motion status variations of the surrounding object with the different action intentions by using the surrounding object interactive motion model. Step 3: Predict the motion status variations of the surrounding object with the different action intentions by using the surrounding object linear motion model.

Figure 10:
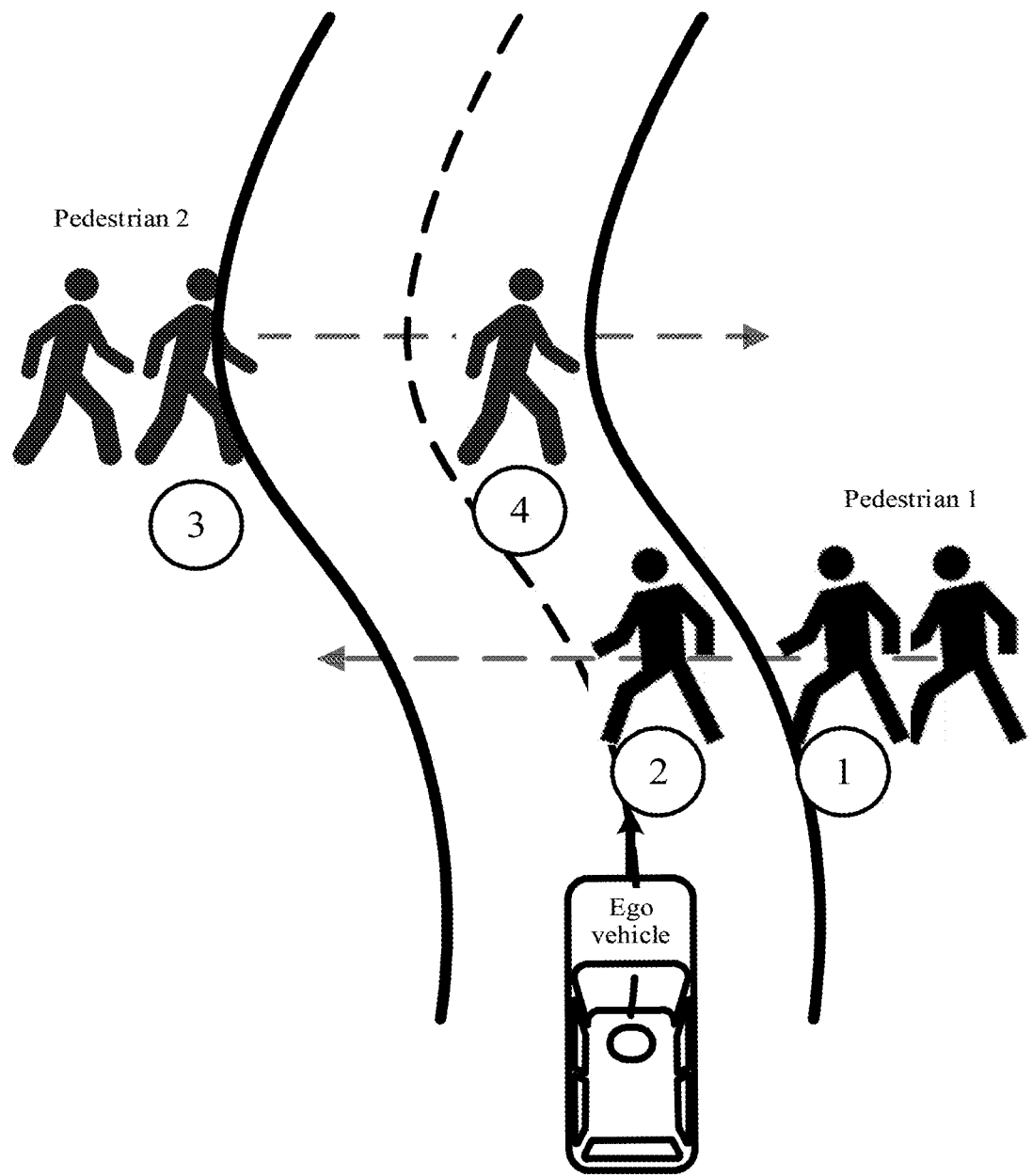
FIG. 10 is a schematic diagram of an example of a surrounding object interactive motion model according to an embodiment of this application.

A scenario in FIG. 10 is used as an example for description. It is assumed that an action intention of a pedestrian 1 is g3: straight crossing the lane. If the surrounding object interactive motion model is not used, the pedestrian 1 moves to a position ② in FIG. 10, ignoring existence of the vehicle. If the surrounding object interactive motion model is used, the pedestrian 1 is very likely to move to a position ① to avoid the vehicle for safety. Similarly, because a time to collision between a pedestrian 2 and the vehicle is relatively long, and an interaction probability related to the pedestrian 2 and the vehicle is relatively low, a possibility that the pedestrian 2 moves to a position ④ in use of the surrounding object linear motion model is greater than a possibility that the pedestrian 2 moves to a position ③ in use of the surrounding object interactive motion model.

For the surrounding object linear motion model, an error of the observation information of the position and the speed of the surrounding object is relatively large. Therefore, in the surrounding object linear motion model, motion statuses of the surrounding object may be set to a Gaussian distribution with a relatively large variance. The surrounding object linear motion model is defined as follows:

$$\begin{bmatrix} s'_{pedestrian} \\ l'_{pedestrian} \\ v'_{pedestrian} \\ g'_{pedestrian} \end{bmatrix} = \begin{bmatrix} s_{pedestrian} \\ l_{pedestrian} \\ v_{pedestrian} \\ g_{pedestrian} \end{bmatrix} + \begin{bmatrix} v_{pedestrian} * \Delta t * \cos(f_s(g_{pedestrian})) + N(\mu_{pedstrians}, \sigma^2_{pedestrian\ s}) \\ v_{pedestrian} * \Delta t * \sin(f_l(g_{pedestrian})) + N(\mu_{pedestrianl}, \sigma^2_{pedestrian\ l}) \\ N(\mu_{pedestrian\ v}, \sigma^2_{pedestrian\ v}) \\ 0 \end{bmatrix}.$$

$\Delta t$ represents a predicted time step, and is usually relatively small. For example, $\Delta t$ may be set to 0.3 seconds. It is assumed that the action intention of the pedestrian remains unchanged within $\Delta t$, that is, $g'_{pedestrian} = g_{pedestrian}$. In addition $f_s(g_{pedestrian})$ and $f_l(g_{pedestrian})$ respectively represent motion heading components of different action intentions in the S direction and the L direction in the S-L coordinate system. In other words, motion headings of the surrounding object with different action intentions are different. $\mu_{pedestrian\ s}$ and $\mu_{pedestrian\ l}$ respectively represent means of motion distances of the surrounding object linear motion model in the S direction and the L direction, or $\sigma_{pedestrian\ s}^2$ and $\sigma_{pedestrian\ l}^2$ respectively represent variances of the motion distances of the surrounding object linear motion model in the S direction and the L direction, and $\mu_{pedestrain\ v}$ and $\mu\sigma_{pedestrian\ v}^2$ respectively represent a mean of motion speeds of the surrounding object linear motion model in the S direction and a variance of the motion speeds of the surrounding object linear motion model in the L direction.

A specific definition of the surrounding object interactive motion model is as follows:

$$\begin{bmatrix} s'_{pedestrian} \\ l'_{pedestrian} \\ v'_{pedestrian} \\ g'_{pedestrian} \end{bmatrix} = \begin{bmatrix} s_{pedestrian} \\ l_{pedestrian} \\ v_{pedestrian} \\ g_{pedestrian} \end{bmatrix} +$$

$$\begin{bmatrix} F_s(v_{pedestrian}, \Delta t, g_{pedestrian}) + N(\mu_{pedstrian\ s}, \sigma^2_{pedestrian\ s}) \\ F_l(v_{pedestrian}, \Delta t, g_{pedestrian}) + N(\mu_{pedestrian\ l}, \sigma^2_{pedestrian\ l}) \\ N(\mu_{pedestrian\ v}, \sigma^2_{pedestrian\ v}) \\ 0 \end{bmatrix}.$$

$F_s(v_{pedestrian}, \Delta t, g_{pedestrian})$ and $F_l(v_{pedestrian}, \Delta t, g_{pedestrian})$ respectively represent motion variation functions of the pedestrian in the S direction and the L direction in the S-L coordinate system when the pedestrian with different action intentions interacts with the vehicle.

It should be noted that step 503 and step 504 are not sequential. Step 503 may be performed before or after step 504, or step 503 and step 504 may be simultaneously performed. A specific manner is not limited.

Step 505: Determine a travelling speed of the vehicle based on the probability redistribution of the different action intentions, the motion status variations of the surrounding object with the different action intentions, and motion status variations of the vehicle under different travelling speed control actions.

It may be understood that an appropriate vehicle speed of the vehicle may be determined based on three factors: the probability redistribution of the different action intentions, the motion status variations of the surrounding object with the different action intentions, and the motion status variations of the vehicle under different travelling speed control actions. In one case, an acceleration of the vehicle may be determined based on the foregoing three factors, and the vehicle is controlled to travel at the acceleration. In another case, an acceleration of the vehicle may be determined based on the foregoing three factors, so that a travelling speed at which the vehicle is to travel is determined based on the acceleration and a current speed of the vehicle, and the vehicle is controlled to travel at the determined travelling speed.

During specific implementation, step 505 may be further implemented through the following S51 to S53: S51: Estimate travelling effects of the vehicle that bring about under the different travelling speed control actions based on the probability redistribution of the different action intentions, the motion status variations of the surrounding object with the different action intentions, and the motion status variations of the vehicle under the different travelling speed control actions. S52: Select a target travelling speed control action from the different travelling speed control actions based on the travelling effects of the vehicle that bring about under the different travelling speed control actions. S53: Determine the travelling speed of the vehicle based on the target travelling speed control action.

Further, in S51, a vehicle status prediction model may be established, and the travelling effects, namely, motion status variations of the vehicle when the vehicle travels at different accelerations, of the vehicle under different travelling speed control, may be predicted based on the vehicle status prediction model.

For the vehicle status prediction model, an error in observation information of status parameters such as a position and a speed of the vehicle is relatively small.

Therefore, in the vehicle status prediction model, motion statuses of the vehicle may be set to a Gaussian distribution with a relatively small variance. The vehicle status prediction model is defined as follows:

$$\begin{bmatrix} s'_{vehicle} \\ l'_{vehicle} \\ v'_{vehicle} \end{bmatrix} = \begin{bmatrix} s_{vehicle} \\ l_{vehicle} \\ v_{vehicle} \end{bmatrix} +$$

$$\begin{bmatrix} v_{vehicle} * \Delta t + 0.5 * a_{vehicle} * \Delta t^2 + N(\mu_{vehicle\ s}, \sigma^2_{vehicle\ s}) \\ N(\mu_{vehicle\ l}, \sigma^2_{vehicle\ l}) \\ a_{vehicle} * \Delta t + N(\mu_{vehicle}, \sigma^2_{vehicle\ v}) \end{bmatrix}.$$

$\mu_{vehicle\ s}$ and $\mu_{vehicle\ l}$ respectively represent means of motion distances of the vehicle status prediction model in the S direction and the L direction, $\sigma^2_{vehicle\ s}$ and $\sigma^2_{vehicle\ l}$ respectively represent variances of the motion distances of the vehicle status prediction model in the S direction and the L direction, and $\mu_{vehicle\ v}$ and $\sigma^2_{vehicle\ v}$ respectively represent a mean of motion speeds of the vehicle status prediction model in the S direction and a variance of motion speeds of the vehicle status prediction model in the L direction.

It may be understood that, considering that an action intention of the surrounding object is not definite, a partially observable Markov decision process (POMDP) may be used to perform decision-making and planning with an optimal speed. It may be understood that the POMDP has a feature of partial observing. To be specific, an action intention of an unobservable part in an uncertain environment is predicted after decision-making and planning is performed by using a general mathematical model. The mathematical model may generally include a state set S, an action set A, a state transition function T, an observation set O, an observation function Z, and a reward function R. With reference to the scenario corresponding to FIG. 1, content included in the mathematical model is defined as follows.

State space S is a set of all possible states of a dynamic entity and a static entity in an environment, namely, the vehicle, a pedestrian 1 (namely, the pedestrian 102 in the foregoing description), and a pedestrian 2 (that is, the pedestrian 103 in the foregoing description).

$$S = \left\{ s | s \in \begin{bmatrix} s_{vehicle}, l_{vehicle}, v_{vehicle}, s_{pedestrian\ 1}, l_{pedestrian\ 1}, v_{pedestrian\ 1}, \\ g_{pedestrian\ 1}, s_{pedestrian\ 2}, l_{pedestrian\ 2}, v_{pedestrian\ 2}, g_{pedestrian\ 2} \end{bmatrix} \right\}.$$

Action space A is a set of acceleration actions that may be used by a self-driving or unmanned vehicle. For ease of description, an extracted common acceleration range is usually discretized, or may also be understood as corresponding gears, for example, A={-3, -2, -1, 0, 0.5, 1, 2, 3}. In other words, the vehicle may travel at eight different initial accelerations.

The state transition function (T) is a critical part of POMDP. This function T describes a state transition process over time and provides a decision basis for selection of an optimal action. For the vehicle, the state transition function T may indicate that the vehicle transits to a $\{s'_{vehicle}, l'_{vehicle}, v'_{vehicle}\}$ state after using an acceleration a in A in a state $\{s_{vehicle}, l_{vehicle}, v_{vehicle}\}$. For the pedestrian 1, the state transition function T indicates that the pedestrian 1 transits to a state $\{s'_{pedestrian\ 1}, l'_{pedestrian\ 1}, v'_{pedestrian\ 1}, g'_{pedestrian\ 1}\}$ when moving under an action intention $g_{pedestrian\ 1}$ in a current state $\{s_{pedestrian\ 1}, l_{pedestrian\ 1}, v_{pedestrian\ 1}, g_{pedestrian\ 1}\}$.

The observation space O generally corresponds to the state space, and represents an observation information set of the vehicle, the pedestrian 1, and the pedestrian 2, that is, $O=\{o|o\in[o_{vehicle}, o_{pedestrian\ 1}, o_{pedestrian\ 2}]\}$. $O_{vehicle}=\{$position: $(x_{vehicle}, y_{vehicle})$, speed: $V_{vehicle}$, acceleration: $a_{vehicle}$, course: $\theta_{vehicle}\}$. $O_{pedestrian\ 1}=\{$position: $(x_{pedestrian\ 1}, y_{pedestrian\ 1})$, motion speed: $V_{pedestrian\ 1}$, motion heading: $\theta_{pedestrian\ 1}\}$. $O_{pedestrian\ 2}=\{$position: $(x_{pedestrian\ 2}, y_{pedestrian\ 2})$, motion speed: $V_{pedestrian\ 2}$, motion heading: $\theta_{pedestrian\ 2}\}$.

The observation function Z represents a probability of obtaining the observation function z after the vehicle, the pedestrian 1, and the pedestrian 2 transit to a state s' after using the acceleration a, that is, $Z(z,s',a)=P(z|s,a)$. It is assumed that positions and speeds of the vehicle and the pedestrian match a Gaussian distribution relative to actual positions and speeds. Because the error of the observation information of the position and the speed of the vehicle is relatively small, and the error of the observation information of the position and the speed of the pedestrian is relatively large, a variance of a Gaussian distribution for the vehicle is different from a variance of a Gaussian distribution for the pedestrian. A variance of a Gaussian distribution of a Gaussian motion model of the vehicle is relatively small, and a variance of a Gaussian distribution of a motion model of the pedestrian is relatively large.

The reward function (Reward) is used to perform quantitative assessment on the determined acceleration. The assessment may be performed based on a collision degree, or a collision degree and a traffic obstruction degree, or a collision degree and a travelling discomfort degree, or a collision degree, a traffic obstruction degree, and a travelling discomfort degree. The collision degree reflects safety, the traffic obstruction degree reflects traffic efficiency, and the travelling discomfort degree may reflect comfort. It should be noted that the determined acceleration may alternatively be assessed based on a purpose.

For example, if the determined acceleration is assessed based only on the collision degree R_col, Reward=R_col. For another example, if the determined acceleration is assessed based on the collision degree R_col, the traffic obstruction degree R_move, and the travelling discomfort degree R_action, Reward=R_col+R_move+R_action.

After some definitions in POMDP are described, the following describes an example specific implementation of S51 in step 505.

It may be understood that all possible accelerations of the vehicle may be traversed, and $[s_{vehicle}', l_{vehicle}', v_{vehicle}']$ that dynamically varies is predicted correspondingly by using the vehicle status prediction model, and is compared with $[s_{pedestrian}', l_{pedestrian}', v_{pedestrian}', g_{pedestrian}']$, to determine whether the vehicle collides with the surrounding object. If no collision occurs, it is determined that a collision degree corresponding to the acceleration is 0, or if a collision occurs, a speed obtained after the vehicle uses the acceleration may be determined as $v_{vehicle}'$. In other words, the collision degree R_col is directly used as the initial expectation value Reward. For example, the travelling effect may be obtained through computation according to the following formula (5):

$$\text{Reward}=R_{col}=w_1*(v'_{vehicle}+c) \qquad \text{formula (5)},$$

where w1 is a specified fixed coefficient, $v'_{vehicle}$ represents a speed, after the current acceleration is used, of the vehicle upon a collision, and c is a constant.

For example, it is assumed that there are a vehicle and a pedestrian. For eight initial accelerations in the action set A, three accelerations at which a collision occurs are determined. In this case, collision degrees R_col1, R_col2, and R_col3 corresponding to the three accelerations may be separately obtained through computation, and a collision degree corresponding to each of the other five accelerations at which no collision occurs is 0.

After the corresponding travelling effects under the different travelling speed control actions (namely, the different accelerations) are obtained in the foregoing manner, the operation of "selecting a target travelling speed control action from the different travelling speed control actions based on the travelling effects of the vehicle that bring about under the different travelling speed control actions" in S52 may be performed. It may be understood that, an occurrence probability distribution b of action intentions is particlized, and a particle set $P=\{particle^1, particle^2, \ldots, particle^m\}$ is obtained, representing a mapping relationship b→P related to the occurrence probability distribution b and a particle set with a weight $w^i$. Then, a target expectation value may be determined based on quantities of particles included in various action intentions and weights of the particles in the particle set. For example, for the action intention g1 of the pedestrian 1, an occurrence probability of the action intention g1 may be represented as $p_{pedestrian\ 1}(g1)=\Sigma_{k=1}^{m}w^k$, where k meets the following condition: an action intention of a particle$^k$ $g_{pedestrian\ 1}^k=g1$, and $w^k$ represents a weight of the particle$^k$.

For S51, as an example, the operation process may include the following step of predicting N steps based on a mapping relationship: a current initial probability distribution $b_0 \rightarrow P=\{particle^1, particle^2, \ldots, particle^m\}$, where the predicted time step is $\Delta t$, and it can be obtained that $T=N\Delta t$. For the acceleration a, $a \in A=\{-3, -2, -1, 0, 0.5, 1, 2, 3\}$, and a travelling effect of the N steps is $G(b_0, a)=\Sigma_{j=0}^{N}\gamma^j R(b_j, a)$, where $R(b_j, a)=\Sigma_{k=1}^{m}w^k*\text{Reward}(particle^k, a)$. $\gamma$ is a discount factor, and is generally a value less than 1. As a quantity N of predicted steps increases, an impact of the discount factor on a decision at a current moment is smaller, and the discount factor is equivalent to a time sequence attenuation factor. It should be noted that an occurrence probability of each action intention is reflected by particles of a same action intention that are accumulated, and a quantity of particles of a same action intention reflects an occurrence probability of the action intention. A risk degree of a collision of each action intention is reflected in a weight $w^k$ of each particle.

In another example, a collision time of each action intention may be further reflected in an interaction probability, an adjusted target intention is determined based on the interaction probability, and a value corresponding to a travelling effect of the vehicle using a target acceleration is computed based on the target intention. Therefore, a target expectation value of the N steps may be computed according to the following formula: $G(b_0, a)=\Sigma_{j=0}^{N}\gamma^j R(b_j, a)$, where $R(b_j, a)=\Sigma_{k=1}^{m}\text{Reward}(particle^k, a)$. It should be noted that an occurrence probability of each action intention is reflected in the following. A quantity of particles corresponding to a same action intention are accumulated, and the quantity of particles corresponding to the same action intention reflects an occurrence probability of the action intention. A risk degree of a collision that occurs under each action intention is reflected in the following. An interaction probability is computed based on a collision time, a target intention corresponding to each action intention is determined, and Reward(particle$^k$, a) is computed based on the target intention.

In still another example, it may be understood that, to more prominently reflect importance of a risk degree for determining a vehicle speed, and improve reliability and safety of the determined vehicle speed, manners in the foregoing two examples may be further combined to compute, based on each action intention, a value corresponding to a travelling effect of the vehicle using a target acceleration. A particle weight that represents particles corresponding to a same action intention reflects impact of the risk degree on the vehicle speed, and the interaction probability also reflects impact of the risk degree on the vehicle speed. For example, a value corresponding to a travelling effect of the N steps may be computed according to the following formula: $G(b_0, a) = \Sigma_{j=0}^{N} \gamma^j R(b_j, a)$, where $R(b_j, a) = \Sigma_{k=1}^{m} w^k * \text{Reward}(\text{particle}^k, a)$. It should be noted that an occurrence probability of each action intention is reflected in the following. A quantity of particles corresponding to a same action intention are accumulated, and the quantity of particles corresponding to the same action intention reflects an occurrence probability of the action intention. A risk degree of a collision that occurs under each action intention is reflected in the following. First, a weight $w^k$ of each particle corresponding to each action intention is used, Second, an interaction probability is computed based on a collision time, a motion status variation corresponding to each action intention is determined, and Reward(particle$^k$, a) is computed based on the motion status variation corresponding to each action intention.

It may be understood that, according to the foregoing example computation method, eight initial accelerations in A may be traversed. To be specific, each acceleration is used as a target acceleration, to obtain a travelling effect corresponding to the target acceleration. Finally, eight corresponding travelling effects may be computed, and may be represented as $G(b_0-3)$, $G(b_0-2)$, $G(b_0-1)$, $G(b_00)$, $G(b_00.5)$, $G(b_01)$, $G(b_02)$, and $G(b_03)$. It should be noted that, the travelling effect is used to indicate a value of a reward function obtained after a target acceleration a is used based on a probability redistribution of various current action intentions. A smaller value corresponding to the travelling effect indicates poorer safety. On the contrary, a larger value corresponding to the travelling effect indicates better safety.

Based on this, it may be understood that, according to a meaning of the value corresponding to the travelling effect, a larger value corresponding to the travelling effect indicates better safety. In this case, in S52, a maximum value corresponding to the travelling effect may be selected from a plurality of values corresponding to the travelling effect, and an acceleration corresponding to the maximum value is determined as the target travelling speed control action, namely, the target acceleration.

For example, it is assumed that in the determined eight target expectation values: $G(b_0-3)$, $G(b_0-2)$, $G(b_0-1)$, $G(b_00)$, $G(b_00.5)$, $G(b_01)$, $G(b_02)$, and $G(b_03)$, a maximum value is $G(b_02)$. In this case, the corresponding initial acceleration 2 corresponding to $G(b_02)$ is selected as the target acceleration. In other words, the target travelling speed control action a=2.

For S53, in a case, the target acceleration may be directly sent to a controller, and the controller controls the vehicle to travel at the target acceleration. In another case, a target speed of the vehicle may be computed based on the target acceleration and a current speed. For example, the target speed is $v = v_0 + a * \Delta t$, where a is the target acceleration, and $v_0$ is the current speed. Then the target speed v is sent to the controller, and the controller controls the vehicle to travel at the target speed v.

It should be noted that in the foregoing implementation, the Reward value corresponding to the travelling effect is determined based only on the collision degree R_col, or the Reward value corresponding to the travelling effect may be determined based on the traffic obstruction degree R_move and/or the travelling discomfort degree R_action. The traffic obstruction degree R_move is determined based on a lane speed limit and a vehicle speed reached when the vehicle uses the target acceleration, and the initial expectation value Reward is further determined based on the traffic obstruction degree R_move existing when the vehicle uses the target acceleration. In this case, Reward=R_col+R_move, and $$R\_move = w_2 * \left(\frac{v'_{vehicle} - v_{max}}{v_{max}}\right)^2,$$

where w2 is a specified fixed coefficient, $v_{vehicle}'$ is a vehicle speed reached when the vehicle uses a target initial acceleration, and vmax is a speed limit of the current lane. The travelling discomfort degree R_action is determined based on the target acceleration and a difference between the target acceleration and the current vehicle speed of the vehicle. The initial expectation value Reward is alternatively determined based on the travelling discomfort degree R_action existing when the vehicle uses the target acceleration. In this case, Reward=R_col+R_action, and R_action=$w_3$* f(action$_{current}$)+$w_4$*f(action$_{current}$-action$_{last}$), where w3 and w4 are specified fixed coefficients, action$_{current}$ represents a current target acceleration, action$_{last}$ represents a target acceleration that is used at a previous moment, f(action$_{current}$) represents a comfort return generated when the current target acceleration is used, to suppress travelling discomfort caused by an excessively high acceleration, and f(action$_{current}$-action$_{last}$) represents a comfort return generated for a current target acceleration variation, and is used to suppress travelling discomfort caused by an excessively large acceleration variation. It should be noted that the initial expectation reward may alternatively be determined based on the collision degree R_col, the traffic obstruction degree R_move, and the travelling discomfort degree R_action. For each manner of determining the Reward value corresponding to the travelling effect, refer to the foregoing implementation of determining, based only on the collision degree R_col, the Reward value corresponding to the travelling effect. Details are not described herein again.

It should be noted that, in several implementations, only the implementation in which the initial expectation value Reward is determined based on the collision degree R_col is used as an example for description. An implementation in which the initial expectation value is determined based on another parameter is similar to this implementation, and details are not described herein again.

It should be noted that specific implementation of step 503 and step 504 may be implemented by the CPU 205 (the decision-making and planning module 222 in the in-vehicle computer system 220 in FIG. 3 or the pedestrian intention distribution prediction and update module 431 in the decision-making and planning layer 430 in FIG. 4) in FIG. 2. Step 505 may be implemented by the CPU 205 (a speed decision-making and planning unit in the decision-making and planning module 222 in the in-vehicle computer system 220 in FIG. 3 or the speed decision-making and planning module 432 in the decision-making and planning layer 430 in FIG. 4) in FIG. 2.

It can be learned that in a scenario such as self-driving, according to the method for determining a vehicle speed provided in this embodiment of this application, the probability distribution of action intentions may be computed based on the observation information of the surrounding object, and the probability redistribution of the different action intentions is computed based on the travel times for the vehicle to travel from the current position to the risk areas corresponding to the different action intentions. Further, the motion status variations of the surrounding object with the different action intentions are predicted based on the travel times for the vehicle to travel to the risk areas corresponding to the different action intentions. Finally, the travelling speed of the vehicle is determined based on the probability redistribution of the different action intentions, the motion status variations of the surrounding object with the different action intentions, and the motion status variations of the vehicle under different travelling speed control actions.

Therefore, in a travelling process of the vehicle, for a plurality of action intentions of the surrounding object of the vehicle, a probability of each action intention may be predicted based on the observation information of the surrounding object. In addition, a risk degree of a collision, between the surrounding object and the vehicle, that is corresponding to each action intention and that is under control of each acceleration of the vehicle is predicted. Then, the vehicle speed is determined based on the probability of each action intention and the risk degree of a collision. In this way, during determining of the vehicle speed, each possible action intention of the surrounding object is considered, and the risk degree of a collision, between the surrounding object and the vehicle, that is corresponding to each action intention and that is under control of each acceleration of the vehicle is further considered. In this way, a high risk, between the surrounding object and the vehicle, that is less likely to occur is not ignored. Therefore, a determined travelling speed is more appropriate for a current driving environment, and a potential safety risk during travelling of the vehicle is reduced.

Figure 11:
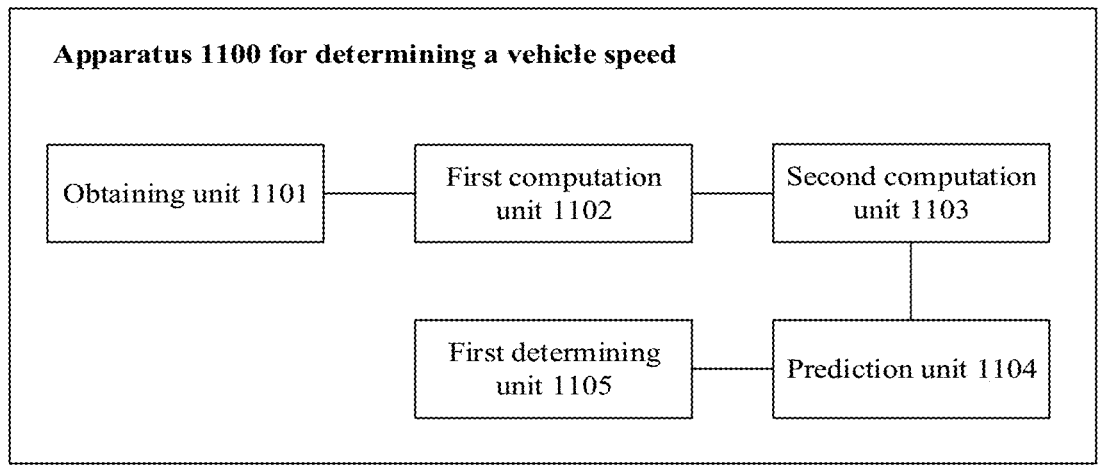
FIG. 11 is a schematic structural diagram of an apparatus for determining a vehicle speed according to an embodiment of this application.

In addition, an embodiment of this application further provides an apparatus for determining a vehicle speed. Referring to FIG. 11, the apparatus 1100 includes a first obtaining unit 1101, a first computation unit 1102, a second computation unit 1103, a prediction unit 1104, and a first determining unit 1105.

The first obtaining unit 1101 is configured to obtain observation information of a surrounding object of a vehicle.

The first computation unit 1102 is configured to compute, based on the observation information of the surrounding object, a probability distribution of different action intentions of the surrounding object.

The second computation unit 1103 is configured to perform redistribution computation on the probability distribution based on travel times for the vehicle to travel from a current position of the vehicle to risk areas corresponding to the different action intentions, to obtain a probability redistribution of the different action intentions, where the risk areas corresponding to the different action intentions are areas in which the surrounding object with the different action intentions passes in a lane in which the vehicle travels.

The prediction unit 1104 is configured to predict motion status variations of the surrounding object with the different action intentions based on the travel times for the vehicle to travel to the risk areas corresponding to the different action intentions.

The first determining unit 1105 is configured to determine a travelling speed of the vehicle based on the probability redistribution of the different action intentions, the motion status variations of the surrounding object with the different action intentions, and motion status variations of the vehicle under different travelling speed control actions.

In a possible implementation, the first computation unit 1102 may include an establishment subunit and a computation subunit. The establishment subunit is configured to establish, in a coordinate system that is based on the lane in which the vehicle travels, a relative position relationship between the surrounding object and the lane and a relative motion relationship between the surrounding object and the lane based on the observation information of the surrounding object. The computation subunit is configured to compute the probability distribution of the different action intentions of the surrounding object based on the relative position relationship between the surrounding object and the lane and the relative motion relationship between the surrounding object and the lane.

In another possible implementation, the apparatus may further include a second obtaining unit, an establishment unit, a second determining unit, and a third computation unit.

The second obtaining unit is configured to obtain observation information of the vehicle. The establishment unit is configured to establish, in a coordinate system that is based on the lane in which the vehicle travels, a relative position relationship between the vehicle and the lane and a relative motion status between the vehicle and the lane, and a relative position relationship between the surrounding object and the lane and a relative motion status between the surrounding object and the lane based on the observation information of the vehicle and the observation information of the surrounding object. The second determining unit is configured to determine, based on the relative position relationship between the surrounding object and the lane and the relative motion status between the surrounding object and the lane, the risk areas corresponding to the different action intentions. The third computation unit is configured to compute, based on the relative position relationship between the vehicle and the lane and the relative motion status between the vehicle and the lane, and the risk areas corresponding to the different action intentions, the travel times for the vehicle to travel from the current position of the vehicle to the risk areas corresponding to the different action intentions.

In still another possible implementation, the second computation unit 1103 may include a processing subunit and an adjustment subunit. The processing subunit is configured to perform particle processing on the probability distribution, where quantities of particles corresponding to the different action intentions are used to represent the probability distribution of the different action intentions. The adjustment subunit is configured to adjust, based on the travel times that are obtained through computation and that are required for the vehicle to travel to the risk areas corresponding to the different action intentions, weights of the particles corresponding to the different action intentions, to obtain the probability redistribution of the different action intentions.

In still yet another possible implementation, the prediction unit 1104 may include a first determining subunit and a prediction subunit. The first determining subunit is configured to determine, based on the travel times for the vehicle to travel to the risk areas corresponding to the different action intentions, probabilities that the surrounding object with the different action intentions changes the action intention. The prediction subunit is configured to predict the motion status variations of the surrounding object with the different action intentions based on the probabilities that the surrounding object with the different action intentions changes the action intention and a random probability.

In a further possible implementation, the first determining unit 1105 may include an estimation subunit, a selection subunit, and a second determining subunit. The estimation subunit is configured to estimate travelling effects of the vehicle that bring about under the different travelling speed control actions based on the probability redistribution of the different action intentions, the motion status variations of the surrounding object with the different action intentions, and the motion status variations of the vehicle under the different travelling speed control actions. The selection subunit is configured to select a target travelling speed control action from the different travelling speed control actions based on the travelling effects of the vehicle that bring about under the different travelling speed control actions. The second determining subunit is configured to determine the travelling speed of the vehicle based on the target travelling speed control action.

It should be noted that the apparatus 1100 is configured to perform the steps in the embodiment corresponding to FIG. 5, To be specific, the obtaining unit 1101 may perform step 501, the first computation unit 1102 may perform step 502, the second computation unit 1103 may perform step 503, the prediction unit 1104 may perform step 504, and the first determining unit 1105 may perform step 505.

It may be understood that the apparatus 1100 is corresponding to the method for determining a vehicle speed provided in the embodiments of this application. Therefore, for implementations of the apparatus 1100 and technical effects that can be achieved by the apparatus 1100, refer to the related descriptions of the implementations of the method for determining a vehicle speed in the embodiments of this application.

Figure 12:
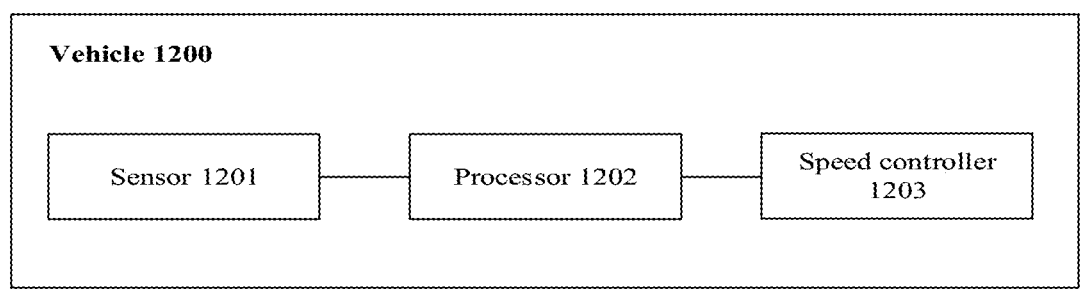
FIG. 12 is a schematic structural diagram of a vehicle according to an embodiment of this application.

In addition, an embodiment of this application further provides a vehicle. Referring to FIG. 12, the vehicle 1200 includes a sensor 1201, a processor 1202, and a vehicle speed controller 1203.

The sensor 1201 is configured to obtain observation information of a surrounding object of the vehicle, and send the observation information to the processor, for example, a radar or a camera.

The processor 1202 is configured to determine a travelling speed of the vehicle according to the method in any one of the implementations of the first aspect, and send the travelling speed to the vehicle speed controller.

The vehicle speed controller 1203 is configured to control the vehicle to travel at the determined travelling speed of the vehicle.

It may be understood that the vehicle 1200 performs the method for determining a vehicle speed provided in the embodiments of this application. Therefore, for implementations of the vehicle 1200 and technical effects that can be achieved by the vehicle 1200, refer to the related descriptions of the implementations of the method for determining a vehicle speed in the embodiments of this application.

Figure 13:
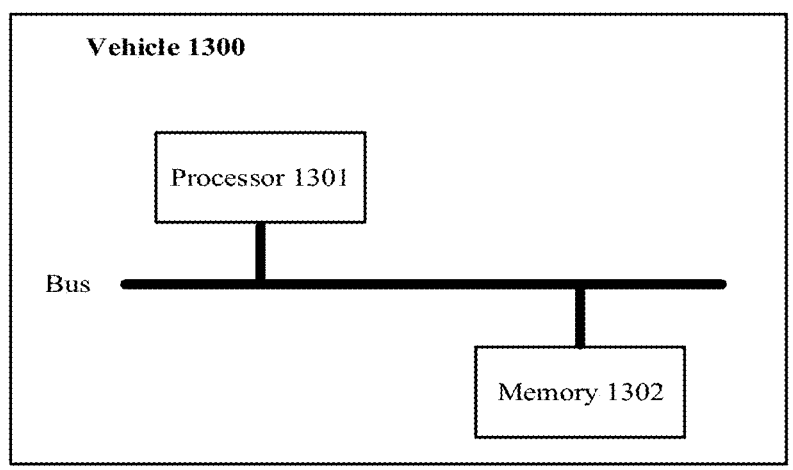
FIG. 13 is a schematic structural diagram of another vehicle according to an embodiment of this application.

In addition, an embodiment of this application further provides a vehicle. Referring to FIG. 13, the vehicle 1300 includes a processor 1301 and a memory 1302. The memory 1302 stores an instruction, and when the processor 1301 executes the instruction, the vehicle 1300 is enabled to perform the method in any one of the implementations of the method for determining a vehicle speed.

It may be understood that the vehicle 1300 performs the method for determining a vehicle speed provided in the embodiments of this application. Therefore, for implementations of the vehicle 1300 and technical effects that can be achieved by the vehicle 1300, refer to the related descriptions of the implementations of the method for determining a vehicle speed in the embodiments of this application.

In addition, an embodiment of this application further provides a computer program product. When the computer program product runs on a computer, the computer performs the method in any one of the implementations of the method for determining a vehicle speed.

In addition, an embodiment of this application further provides a computer-readable storage medium. The computer-readable storage medium stores an instruction. When the instruction is run on a computer or a processor, the computer or the processor is enabled to perform the method in any one of the implementations of the method for determining a vehicle speed.

"First" in terms such as "first risk degree" mentioned in the embodiments of this application is used only for name identification, and does not indicate the first in sequence. This rule is also applicable to "second" and the like.

From the foregoing descriptions of the implementations, a person skilled in the art may clearly understand that all or some steps of the method in the foregoing embodiment may be implemented by using a combination of software and a universal hardware platform. Based on such an understanding, the technical solutions of this application may be implemented in a form of a software product. The software product may be stored in a storage medium, for example, a read-only memory (ROM)/random-access memory (RAM), a magnetic disk, or an optical disc, and includes several instructions for instructing a computer device (which may be a personal computer, a server, or a network communications device such as a router) to perform the method described in the embodiments or some parts of the embodiments of this application.

The embodiments in this specification are all described in a progressive manner. For same or similar parts in the embodiments, reference may be made to these embodiments, and each embodiment focuses on a difference from other embodiments. Especially, an apparatus embodiment is basically similar to a method embodiment, and therefore is described briefly. For related parts, reference may be made to some descriptions in the method embodiment. The described apparatus embodiment is merely an example. The modules described as separate parts may or may not be physically separate, and parts displayed as modules may or may not be physical modules, may be located in one position, or may be distributed on a plurality of network units. Some or all of the modules may be selected based on actual needs to achieve the objectives of the solutions of the embodiments. A person of ordinary skill in the art may understand and implement the embodiments of the present disclosure without creative efforts.

The foregoing descriptions are merely example implementations of this application, but are not intended to limit the protection scope of this application.

What is claimed is:

1. A method for determining a vehicle speed, comprising:
obtaining, by an in-vehicle sensor system mounted in a vehicle, first observation information of a surrounding object of the vehicle;
establishing a coordinate system related to a lane in which the vehicle travels;
establishing, based on the first observation information and the coordinate system, a relative position relationship between the surrounding object and the lane and a relative motion relationship between the surrounding object and the lane;
computing, by a processor coupled to the in-vehicle sensor system based on the relative position relationship and the relative motion relationship, a probability distribution of different action intentions of the surrounding object;
performing a redistribution computation on the probability distribution based on travel times required for the vehicle to travel from a current position of the vehicle to risk areas corresponding to the different action intentions to obtain a probability redistribution of the different action intentions, wherein the risk areas are in the lane in which the vehicle travels and located proximate to the surrounding object;
predicting first motion status variations of the surrounding object based on the travel times;
determining a travelling speed of the vehicle based on the probability redistribution, the different action intentions, the first motion status variations, and second motion status variations of the vehicle under different travelling speed control actions; and
controlling, by an in-vehicle control system coupled to the processor, the vehicle to travel at the determined travelling speed.

2. The method of claim 1, further comprising:
obtaining second observation information of the vehicle;
establishing, based on the second observation information, the first observation information, and the coordinate system, a first relative position relationship between the vehicle and the lane, a first relative motion status between the vehicle and the lane, a second relative position relationship between the surrounding object and the lane, and a second relative motion status between the surrounding object and the lane;
determining, based on the second relative position relationship and the second relative motion status, the risk areas; and
computing, based on the first relative position relationship, the first relative motion status, and the risk areas, the travel times.

3. The method of claim 1, further comprising:
performing a particle processing on the probability distribution, wherein quantities of particles corresponding to the different action intentions represent the probability distribution; and
adjusting, based on the travel times, weights of the particles to obtain the probability redistribution.

4. The method of claim 1, further comprising:
determining, based on the travel times, probabilities that the surrounding object with the different action intentions changes an action intention; and
further predicting the first motion status variations based on the probabilities and a random probability.

5. The method of claim 1, further comprising:
estimating travelling effects of the vehicle under the different travelling speed control actions based on the probability redistribution, the different action intentions, the first motion status variations, and the second motion status variations;
selecting a target travelling speed control action from the different travelling speed control actions based on the travelling effects; and
further determining the travelling speed based on the target travelling speed control action.

6. The method of claim 1, wherein when there are at least two surrounding objects, the different action intentions comprise a combination of intentions corresponding to each of the at least two surrounding objects.

7. The method of claim 1, wherein the surrounding object comprises a pedestrian.

8. An apparatus for determining a vehicle speed comprising:
an in-vehicle sensor system mounted in a vehicle and configured to obtain first observation information of a surrounding object of the vehicle;
a memory configured to store programming instructions;
a processor coupled to the in-vehicle sensor system and the memory, wherein the programming instructions cause the processor to be configured to:
establish a coordinate system related to the lane;
establish, based on the first observation information and the coordinate system, a relative position relationship between the surrounding object and the lane and a relative motion relationship between the surrounding object and the lane;
compute, based on the relative position relationship and the relative motion relationship, a probability distribution of different action intentions of the surrounding object;
perform a redistribution computation on the probability distribution based on travel times for the vehicle to travel from a current position of the vehicle to risk areas corresponding to the different action intentions to obtain a probability redistribution of the different action intentions, wherein the risk areas are in a lane in which the vehicle travels and located proximate to the surrounding object;
predict first motion status variations of the surrounding object based on the travel times; and
determine a travelling speed of the vehicle based on the probability redistribution, the different action intentions, the first motion status variations, and second motion status variations of the vehicle under different travelling speed control actions; and
an in-vehicle control system coupled to the processor and configured to control the vehicle to travel at the determined travelling speed.

9. The apparatus of claim 8, wherein the programming instructions further cause the processor to be configured to:
obtain second observation information of the vehicle;
establish, based on the lane in which the vehicle travels, the second observation information, the first observation information, and the coordinate system, a first relative position relationship between the vehicle and the lane, a first relative motion status between the vehicle and the lane, a second relative position relationship between the surrounding object and the lane, and a second relative motion status between the surrounding object and the lane;
determine, based on the second relative position relationship and the second relative motion status, the risk areas; and compute, based on the first relative position relationship, the first relative motion status, and the risk areas, the travel times.

10. The apparatus of claim 8, wherein the programming instructions further cause the processor to be configured to:
perform a particle processing on the probability distribution, wherein quantities of particles corresponding to the different action intentions represent the probability distribution; and
adjust, based on the travel times, weights of the particles to obtain the probability redistribution.

11. The apparatus of claim 8, wherein the programming instructions further cause the processor to be configured to:
determine, based on the travel times, probabilities that the surrounding object with the different action intentions changes an action intention; and
further predict the first motion status variations based on the probabilities and a random probability.

12. The apparatus of claim 8, wherein the programming instructions further cause the processor to be configured to:
estimate travelling effects of the vehicle under the different travelling speed control actions based on the probability redistribution, the different action intentions, the first motion status variations, and the second motion status variations;
select a target travelling speed control action from the different travelling speed control actions based on the travelling effects; and
determine the travelling speed based on the target travelling speed control action.

13. The apparatus of claim 8, wherein when there are at least two surrounding objects, the different action intentions comprise a combination of intentions corresponding to each of the at least two surrounding objects.

14. The apparatus of claim 8, wherein the surrounding object comprises a pedestrian.

15. A computer program product comprising computer-executable instructions stored on a non-transitory computer readable storage medium that, when executed by a processor, cause an apparatus to:
obtain, by an in-vehicle sensor system mounted in a vehicle, first observation information of a surrounding object of the vehicle;
establish a coordinate system related to the lane;
establish, based on the first observation information and the coordinate system, a relative position relationship between the surrounding object and the lane and a relative motion relationship between the surrounding object and the lane;
compute, based on the relative position relationship and the relative motion relationship, a probability distribution of different action intentions of the surrounding object;
perform a redistribution computation on the probability distribution based on travel times required for the vehicle to travel from a current position of the vehicle to risk areas corresponding to the different action intentions to obtain a probability redistribution of the different action intentions, wherein the risk areas are in a lane in which the vehicle travels and located proximate to the surrounding object;
predict first motion status variations of the surrounding object based on the travel times; and
determine a travelling speed of the vehicle based on the probability redistribution, the different action intentions, the first motion status variations, and second motion status variations of the vehicle under different travelling speed control actions.

16. The computer program product of claim 15, wherein the computer-executable instructions further cause the apparatus to:
obtain second observation information of the vehicle;
establish, based on the second observation information, the first observation information, and the coordinate system, a first relative position relationship between the vehicle and the lane, a first relative motion status between the vehicle and the lane, a second relative position relationship between the surrounding object and the lane, and a second relative motion status between the surrounding object and the lane;
determine, based on the second relative position relationship and the second relative motion status, the risk areas; and
compute, based on the first relative position relationship, the first relative motion status, and the risk areas, the travel times.

17. The computer program product of claim 15, wherein the computer-executable instructions further cause the apparatus to:
perform a particle processing on the probability distribution, wherein quantities of particles corresponding to the different action intentions represent the probability distribution of the different action intentions; and
adjust, based on the travel times, weights of the particles corresponding to the different action intentions to obtain the probability redistribution.

18. The computer program product of claim 15, wherein the computer-executable instructions further cause the apparatus to:
determine, based on the travel times, probabilities that the surrounding object with the different action intentions changes an action intention; and
further predict the first motion status variations based on the probabilities and a random probability.

19. The computer program product of claim 15, wherein the computer-executable instructions further cause the apparatus to:
estimate travelling effects of the vehicle under the different travelling speed control actions based on the probability redistribution, the first motion status variations, and the second motion status variations;
select a target travelling speed control action from the different travelling speed control actions based on the travelling effects; and
further determine the travelling speed based on the target travelling speed control action.

20. The computer program product of claim 15, wherein the surrounding object comprises a pedestrian.

* * * * *